US006907487B2

(12) United States Patent
Singh et al.

(10) Patent No.: US 6,907,487 B2
(45) Date of Patent: *Jun. 14, 2005

(54) ENHANCED HIGHLY PIPELINED BUS ARCHITECTURE

(75) Inventors: Gurbir Singh, Gig Harbor, WA (US); Robert J. Greiner, Beaverton, OR (US); Stephen S. Pawlowski, Beaverton, OR (US); David L. Hill, Cornelius, OR (US); Donald D. Parker, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 549 days.

This patent is subject to a terminal disclaimer.

(21) Appl. No.: 09/783,852

(22) Filed: Feb. 14, 2001

(65) Prior Publication Data

US 2001/0037421 A1 Nov. 1, 2001

Related U.S. Application Data

(63) Continuation-in-part of application No. 09/474,058, filed on Dec. 29, 1999.

(51) Int. Cl.[7] .............................................. G06F 13/14
(52) U.S. Cl. ............................ 710/305; 710/8; 710/60; 710/315; 710/61; 713/501
(58) Field of Search ............................ 710/305, 60, 8, 710/315, 61; 713/501

(56) References Cited

U.S. PATENT DOCUMENTS

| 5,548,733 A | 8/1996 | Sarangdhar et al. |
| 5,568,620 A | 10/1996 | Sarangdhar et al. |
| 5,581,782 A | 12/1996 | Sarangdhar et al. |
| 5,615,343 A | 3/1997 | Sarangdhar et al. |
| 5,796,977 A | 8/1998 | Sarangdhar et al. |
| 5,812,803 A | * 9/1998 | Pawlowski et al. ......... 710/305 |
| 5,838,995 A | * 11/1998 | Chen et al. .................... 710/60 |
| 5,844,858 A | 12/1998 | Kyung |
| 5,903,738 A | 5/1999 | Sarangdhar et al. |
| 5,919,254 A | 7/1999 | Pawlowski et al. |
| 5,937,171 A | 8/1999 | Sarangdhar et al. |
| 5,964,856 A | 10/1999 | Wu et al. |
| 5,978,869 A | 11/1999 | Gutherie et al. |
| 5,999,023 A | 12/1999 | Kim |
| 6,081,877 A | * 6/2000 | Taki ............................ 711/167 |
| 6,092,156 A | 7/2000 | Schibinger et al. |
| 6,102,118 A | 8/2000 | Moore |
| 6,108,736 A | 8/2000 | Bell |
| 6,405,271 B1 | 6/2002 | MacWilliams et al. |
| 6,449,677 B1 | * 9/2002 | Olarig et al. ................ 710/305 |

(Continued)

FOREIGN PATENT DOCUMENTS

| EP | 706137 A1 * | 4/1996 | ......... G06F/13/364 |
| WO | WO 9524678 A2 * | 9/1995 | ........... G06F/13/00 |
| WO | WO 99/36858 | 7/1999 | |

OTHER PUBLICATIONS

"Protocol Extensions to Microprocessor Memory Bus to Support Extended Address Space," May 1, 1994, IBM, vol. 37, Issue 5 p. 389–390.*

(Continued)

Primary Examiner—Mark H. Rinehart
Assistant Examiner—Donna K. Mason
(74) Attorney, Agent, or Firm—Jeffery S. Draeger

(57) ABSTRACT

A bus agent that may be used in an enhanced highly pipelined bus architecture. In one embodiment, the bus agent includes a control interface to drive a control signal at a clock frequency, an address bus interface to drive address elements at twice the clock frequency, and a data bus interface to drive data elements at four times the clock frequency. The address bus interface drives a substantially centered address strobe transition for each address element, and the data bus interface drives a substantially centered data strobe transition for each data element.

62 Claims, 15 Drawing Sheets

U.S. PATENT DOCUMENTS

| | | | | |
|---|---|---|---|---|
| 6,487,621 | B1 | * | 11/2002 | MacLaren .................. 710/240 |
| 6,601,121 | B2 | * | 7/2003 | Singh et al. ................ 710/112 |
| 6,609,171 | B1 | * | 8/2003 | Singh et al. ................ 710/305 |
| 2001/0007999 | A1 | * | 7/2001 | Rasmussen et al. .......... 710/60 |
| 2001/0037424 | A1 | * | 11/2001 | Singh et al. ................ 710/220 |
| 2002/0147875 | A1 | * | 10/2002 | Singh et al. ................ 710/305 |

OTHER PUBLICATIONS

Picker, D., et al., "Enhancing SCI's Fairness Protocol for Increased Throughput," Oct. 19–22, 1993, IEEE 1993 International Conference on Network Protocols, p. 292–299.*

Mindshare, Inc., Tom Shanley, Pentium® Pro and Pentium® II System Architecture Second Edition, Addison–Wesley, 1998, 180 pages.

Intel Corporation, "Accelerated Graphics Port Interface Specification," Revision 1.0, Jul. 31, 1996.

Intel®, Pentium® II Processor Developer's Manual, Chapters 1–6, Oct. 1997.

Intel Corporation, "*Intel Multibus® Specification*", 1978.

Intel Corporation, "*Multibus® II Bus Architecture Specification Handbook*," 1984.

Intel Corporation, "*High–Performance Synchronous 32–Bit Bus: Multibus II*,".

* cited by examiner

ENHANCED HIGHLY PIPELINED BUS ARCHITECTURE

RELATED APPLICATIONS

This application is a continuation-in-part of application Ser. No. 09/474,058, filed Dec. 29, 1999, entitled Quad Pumped Bus Architecture And Protocol.

BACKGROUND

1. Field

This disclosure generally relates to a pipelined bus architecture and protocol and various particular aspects thereof.

2. Description of Related Art

With the increasing complexity and demands of software applications, there is demand for processors to provide increased throughput and bandwidth. There may be one or more resources which can limit computer performance, such as input/output (I/O) speed or bandwidth, memory size, etc. One resource that often limits or throttles computer performance is the speed and bandwidth of a bus such as a processor bus (also referred to as a front side bus), which is the bus provided between one or more processors and the chipset. Some bus prior art bus protocols provide support multi-phase pipelined transaction schemes for the processor bus. For example, some Pentium® processors such as the Pentium Pro® processor, Pentium® II processor, and the Pentium® III processor (hereafter "P6 bus protocol processors") from Intel Corporation and chipsets that communicate with such components support an advanced multi-phase pipelined bus protocol. Various details of the bus protocols for the P6 bus protocol processors are found in the Pentium Pro® processor, Pentium® II processor, and the Pentium® III processor Family Developer's Manuals. For example, the P6 bus protocol is described in the Pentium® II Processor Developer's Manual (see, e.g., Chapter 3), October, 1997, Intel document number 243502-001, available from Intel Corporation of Santa Clara, Calif. as well as *Pentium® Pro and Pentium® II System Architecture*, by Tom Shanley, December 1997.

Other processors have altered the data transfer protocol by increasing the data transfer rate using a double-pumped, source synchronous protocol. See, for example, PCT publication WO 99/36858. Additional changes to improve various bus characteristics such as bus throughput and/or reliability may be desirable.

BRIEF DESCRIPTION OF THE DRAWINGS

The present invention is illustrated by way of example and not limitation in the figures of the accompanying drawings.

DETAILED DESCRIPTION

The following description provides an enhanced highly pipelined bus architecture and protocol. In the following description, numerous specific details such as logic implementations, sizes and names of signals and buses, types and interrelationships of system components, and logic partitioning/integration choices are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement appropriate logic circuits without undue experimentation.

I. Introduction

According to an embodiment, a processor bus is connected to a plurality of bus agents. In a common clock signaling mode, signals (such as control signals) can be driven onto the bus at a rate that is substantially the same as the frequency of a common bus clock. In this mode, the edges of the bus clock identify points for sampling the signals driven onto the bus.

Bus throughput can be increased by driving information elements (e.g., address or data) onto the bus by a driving agent at a rate that is a multiple of the frequency of the bus clock. The driving agent also temporarily activates a strobe signal to identify sampling points for the information elements driven in the multi pumped signaling mode. Information elements for a request can be driven, for example, using a double pumped signaling mode in which two information elements are driven during one bus clock cycle. Data elements for a data line transfer can be driven, for example, using a quad pumped signaling mode in which four data elements are driven during one bus clock cycle. Multiple strobe signals can be temporarily activated in an offset or staggered arrangement to reduce the frequency of the strobe signals. Sampling symmetry can be improved by using only one type of edge (e.g., either the rising edges or the falling edges) of the strobe signals to identify the sampling points.

In addition, minimum latencies between transaction phases can be modified to more closely match the maximum speed of the bus operating in the multi pumped signaling mode. In other words, since request and data information may be transmitted in fewer clock cycles (e.g., two instead of three), other phases may be reduced in duration, at least under some circumstances, to complete in the same number of clock cycles. Having a shorter minimum phase duration can lead to more overlap in transaction phases. Thus, protocol rules may be adjusted to compensate for potential overlaps that may not have occurred and to generally enhance overall bus throughput.

II. Architecture

Figure 1:
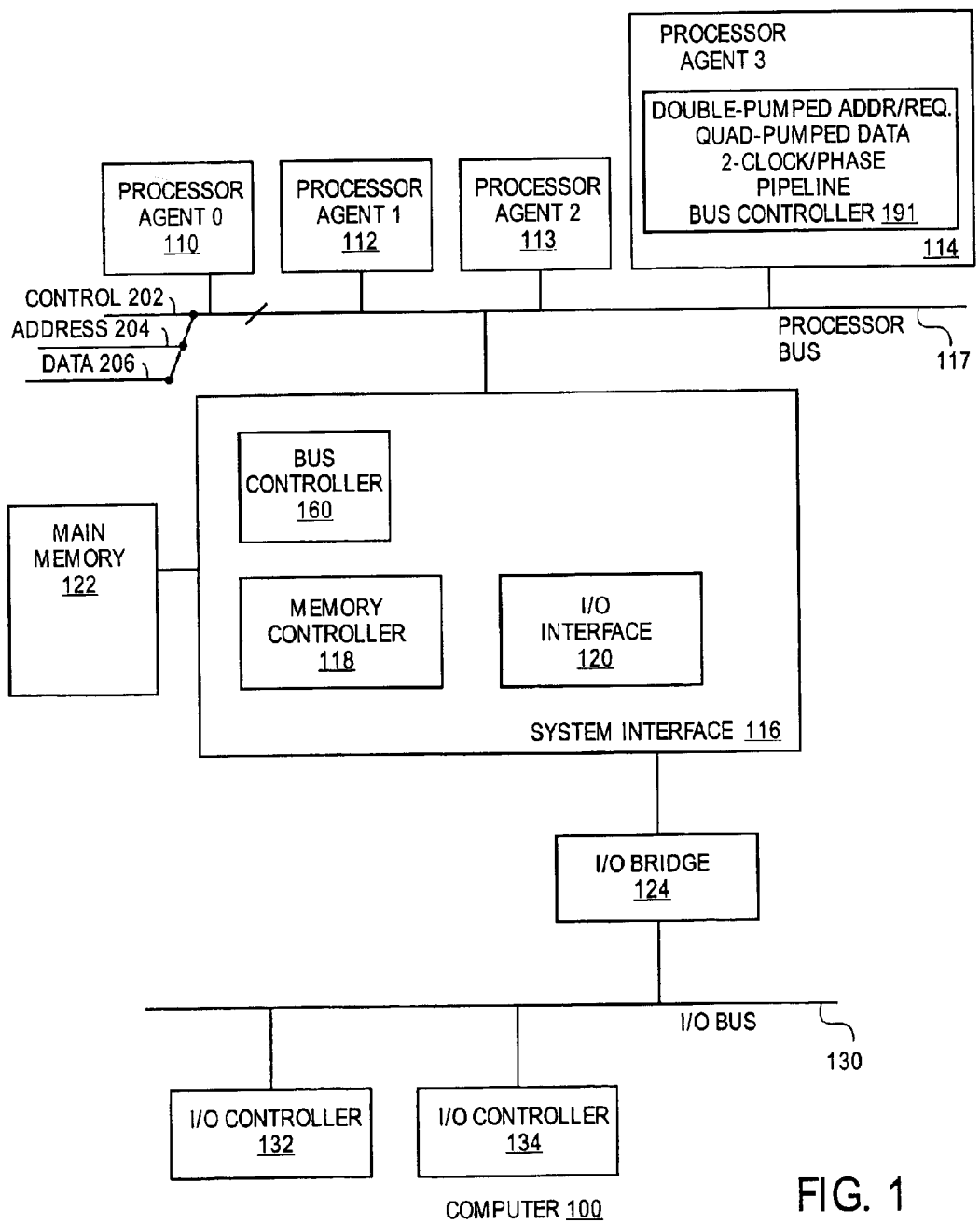
FIG. 1 is a block diagram illustrating a computer according to an example embodiment.

FIG. 1 is a block diagram illustrating a computer according to an example embodiment. The computer includes one or more processors, including a processor 110, a processor 112, a processor 113, and a processor 114. Each processor also may include one or more internal caches (not shown). As illustrated with respect to processor 114, each processor contains a bus controller 191 to direct interaction with the bus.

Each processor is connected to a common processor bus 117 (also known as the host bus or front side bus). In one embodiment, the processor bus 117 includes a control bus 202, an address bus 204 and a data bus 206. According to an embodiment, the data bus 206 includes many signals, including 64 data lines D[63:0]. The address bus 204 also includes many signals including 36 address lines A[35:0]. The address lines may include only address lines A[35:3] in some embodiments with byte enable or other length indicating signals providing address information that may otherwise be transmitted using address pins A[2:0].

The processor bus 117 includes a bus clock (BCLK). The bus clock is commonly provided to agents via the control bus 202 of processor bus 117. The control bus 202 may also include many additional signals. The address bus 204, control bus 202 and data bus 206 may be multidrop bi-directional buses. According to an embodiment, the term "multidrop" means that the buses are connected to three or more bus agents, as opposed to a point-to-point bus which is connected only between two bus agents. In many embodiments (e.g., single processor systems), however, the buses may be point-to-point buses which couple a processor to a system interface (or chipset) bus agent.

A system interface 116 (or chipset) is also connected to the processor bus 117 to interface several other components to the processor bus 117. System interface 116 includes a memory controller 118 for interfacing a main memory subsystem 122 to processor bus 117. The main memory subsystem 122 typically includes one or more memory cards and a control circuit. System interface 116 also includes an input/output (I/O) controller 120 to interface one or more I/O bridges or I/O devices to the processor bus 117. In the embodiment shown in FIG. 1, the I/O controller 120 interfaces an I/O bridge 124 to the processor bus 117. I/O bridge 124 operates as a bus bridge to interface between system interface 116 and an I/O bus 130. One or more I/O controllers and I/O devices can be connected to the I/O bus 130, such as I/O controller 132 and I/O controller 134, for example. I/O bus 130 may be a Peripheral Component Interconnect (PCI) bus or other type of I/O bus.

III. Agents

Bus agents issue transactions on the processor bus 117 to transfer data and system information. A bus agent is any device that connects to the processor bus 117. There may be several classifications of bus agents:

1) Central Agent: handles reset, hardware configuration and initialization, special transactions and centralized hardware error detection and handling. An example is a processor.

2) I/O Agent: interfaces to I/O devices using I/O port addresses. An I/O agent can be a bus bridge to another bus used for I/O devices, such as a PCI bridge.

3) Memory Agent: provides access to main memory, such as memory controller 118. Memory and I/O agents may be combined in a single component such as a chipset component.

A particular bus agent can have one or more of several roles in a transaction:

1) Requesting Agent: The bus agent that issues the transaction.

2) Addressed Agent: The agent that is addressed by the transaction, also called the Target Agent. A memory or I/O transaction is addressed to the memory or I/O agent that recognizes the specified memory or I/O address. A deferred reply transaction is addressed to the agent that issued the original transaction.

3) Snooping Agent: A caching bus agent that observes ("snoops") bus transactions to maintain cache coherency.

4) Responding Agent: The agent that provides the response to the transaction (typically the addressed agent). According to an embodiment, the responding agent drives the response onto the control bus using the response signals RS[2:0].

IV. Operations, Transactions and Phases

According to an embodiment, bus activity on the processor bus 117 is hierarchically organized into operations, transactions and phases. Additionally, some phases which are multi-pumped may have multiple sub-phases.

An operation is a bus procedure that appears atomic (e.g., appears to be indivisible or appears to happen at one time) to software even though it may not be atomic on the bus 117. An operation may consist of a single bus transaction, but sometimes may involve multiple bus transactions or a single transaction with multiple data transfers. Examples include a read operation, a write operation, a locked read-modify-write operation and deferred operations.

A transaction is the set of bus activities related to a single bus request. A transaction begins with bus arbitration, and the assertion of the ADS# signal (indicating that an address is being driven) and a transaction address. Transactions are driven, for example, to transfer data, to inquire about a changed cache state, or to provide the system with information.

A phase uses a specific set of signals to communicate a particular type of information. The phases can include arbitration, request, snoop, response and data phases. Not all transactions contain all phases, and some phases can be overlapped. The arbitration phase is a phase in which the bus agents determine which bus agent will be the next bus owner (an agent owns the bus before issuing a transaction). The request phase is a phase in which the transaction is issued to the bus. The snoop phase is a phase in which cache coherency is enforced. The response phase is a phase in which the addressed or target agent drives a transaction response onto the bus. In the data phase, the requesting or responding or snooping agent drives or accepts the transaction data.

Protocol Changes for One Embodiment

Figure 2:
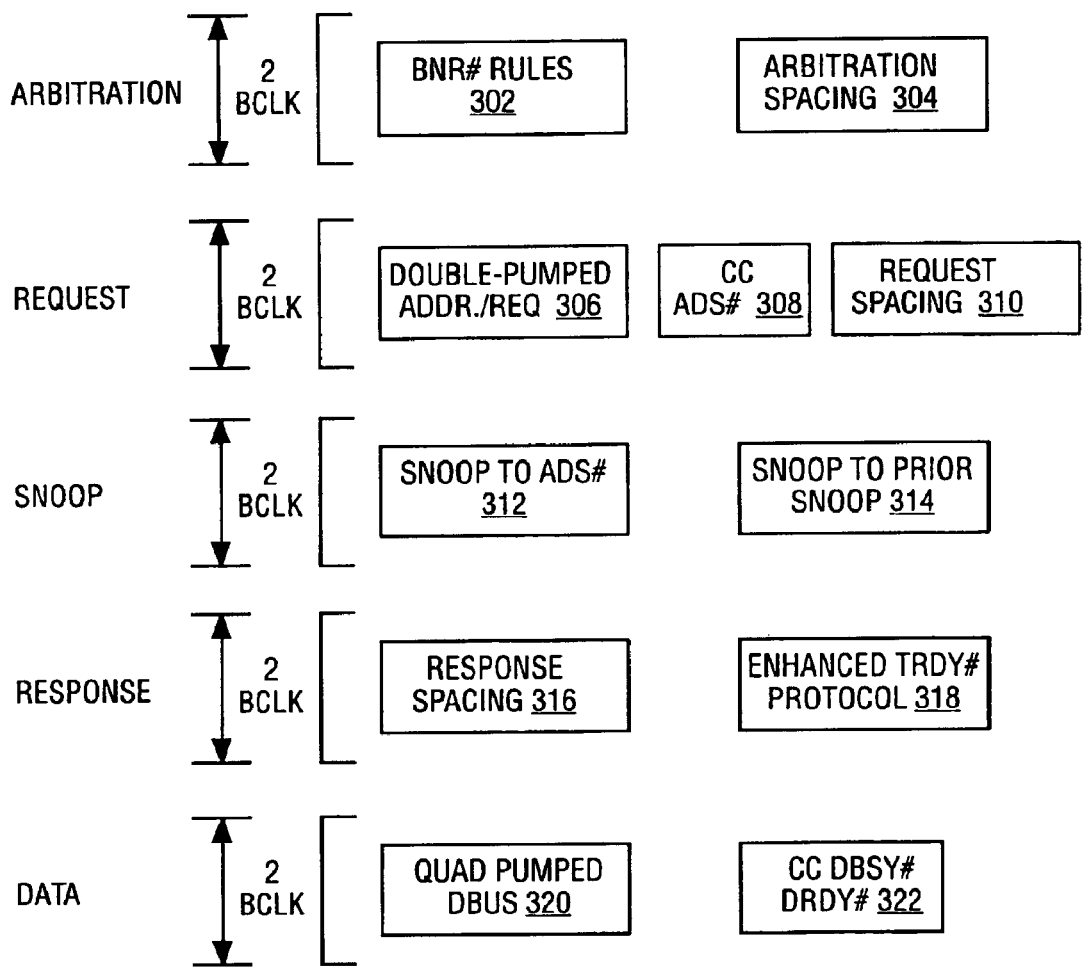
FIG. 2 is a diagram illustrating changes to a pipelined bus protocol according to one embodiment.

FIG. 2 illustrates an overview of changes that are made in one embodiment to move from a pipelined bus protocol having a nominal phase duration of three bus clock cycles to a protocol having a nominal phase duration of two bus clock cycles. Of course, some phases may be excluded from certain transactions, and some phases may be longer in some transactions.

As indicated in FIG. 2, in the arbitration phase, new block next request (BNR#) rules may be utilized (block 302) and arbitration-to-arbitration latency may be adjusted (block 304). In particular, the bus agent 345 may be capable of initiating an arbitration phase after two bus clock cycles from a prior arbitration phase and capable of receiving and responding to a block next request signal two bus clock cycles after assertion of an address strobe signal.

In the request phase, double-pumped transmission of address and data information may be utilized (indicated in block 306) in conjunction with control signals such as the address strobe signal (ADS) that are transmitted using common clock protocols (block 308). Additionally, request spacing may be adjusted as indicated in block 310. For example, the bus agent 345 may be capable of initiating a second request phase for a second transaction two clocks after a first request phase for a first transaction by asserting request signals and an address strobe signal for the second transaction two bus cycles after assertion of an address strobe signal for the first transaction occurs.

In the snoop phase, timing of a snoop window with respect to the ADS signal maybe adjusted (block 312), and timing of the snoop window with respect to another snoop window may be adjusted (block 314). In one embodiment, the bus agent 345 may be capable of sensing or asserting one or more of a plurality of snoop status signals for transaction N on a plurality of snoop status interfaces during a snoop phase occurring upon the later of three or more bus clock cycles of a bus clock signal after the assertion of ADS for transaction N and a most recent snoop phase for another transaction has been observed completed for zero or more clocks.

In the response phase, response phase timing may be adjusted as indicated in block 316. Additionally, an enhanced target ready (TRDY) protocol may be used as indicated in block 318. In one embodiment, the bus agent may be capable of asserting a response for transaction N two or more bus clock cycles after asserting a response for transaction N-1. In one embodiment, the bus agent 345 is also capable of asserting the target ready signal for transaction N if the bus agent is asserting the data busy signal for the transaction N-1 and deasserts the data busy signal.

In the data phase, the bus agent 345 may transmit data in a quad pumped manner (block 320) in conjunction with control signals such as a data busy signal (DBSY) and data ready signals such as DRDY that are communicated using a common clock protocol at the bus clock frequency (block 322).

The following table illustrates a concise summary of the changes made in one embodiment from a prior art system. These changes will be further discussed below.

Protocol Change Summary for One Embodiment

| Ph. | Protocol Aspect | P6 Bus | One Embodiment of Enhanced Protocol |
|---|---|---|---|
| ARBITRATION | Arbitration Rules | See P6 bus documentation* | No change |
| | BREQ#/BPRI# Assertion | See P6 bus documentation* | No change |
| | BREQ#/BPRI# Deassertion | Minimum: Clock of ADS# assertion | Minimum: Clock of ADS# assertion |
| | BREQ#/BPRI# Deassertion Pulse Width | Minimum: BREQn#: 1 clock BPRI# - 2 clocks | Minimum: BREQn#: 1 clock BPRI# - 1 clock |
| | Signal Transfer Protocol | Common Clock (1x) | Common Clock (1x) |
| | BNR# Assertion Rule (Transaction N) | Either: 1. Three clocks after ADS# assertion for transaction N; AND 2. BNR# is observed inactive OR 1. two clocks after a previous BNR# stall is sampled inactive (if in Throttle mode) | Either: 1. Two clocks after ADS# assertion for transaction N; AND 2. BNR# is observed inactive OR 1. two clocks after a previous BNR# stall is sampled inactive (if in Throttle mode) |
| | BNR# duration | One Clock | One Clock |
| | BNR# Sample Rule | Every clock edge until sampled asserted OR Every other clock edge until sampled deasserted | Every clock edge until sampled asserted OR Every other clock edge until sampled deasserted |
| | Maximum BNR# Activation Rate (for back to back transactions) | Every four clocks | Every four clocks |
| | BNR# Signal Type | Common Clock (1x) - (Wired-OR) | Common Clock (1x) - (Wired-OR) |
| REQUEST | Request Assertion Rule (for transaction N) | 1. Clock after ownership observation, AND 2. Three or more clocks after ADS# assertion for transaction N-1, AND 3. BNR# is observed inactive, AND | 1. Clock after ownership observation, AND 2. Two or more clocks after ADS# assertion for transaction N-1, AND 3. BNR# is observed inactive, AND |

-continued

Protocol Change Summary for One Embodiment

| Ph. | Protocol Aspect | P6 Bus | One Embodiment of Enhanced Protocol |
|---|---|---|---|
| | | 4. LOCK#, if not activated by this agent, is observed inactive | 4. LOCK#, if not activated by this agent, is observed inactive |
| | Duration | Two Clocks | One Clock |
| | Maximum Rate | One per every three clocks | One per every two clocks |
| | Signal Type | All signals: Common Clock (1x) | ADS, AP[1:0]#: Common Clock (1x) All others: Source Synchronous, Double pumped (2x) |
| SNOOP | HIT#/HITM#/ DEFER# Assertion Rule | When the later of the following conditions occurs:<br>1. four or more clocks after ADS# assertion for transaction N; AND<br>2. the most recent snoop phase has been observed completed for one or more clocks. | When the later of the following conditions occurs:<br>1. three or more clocks after ADS# assertion for transaction N; AND<br>2. the most recent snoop phase has been observed completed for zero or more clocks. |
| | HIT#/HITM#/ DEFER# Duration | One Clock | One Clock |
| | Maximum HIT#/HITM#/ DEFER# Activation Rate (for back to back transactions) | One per every three clocks | One per every two clocks |
| | HIT#/HITM#/ DEFER# Signal Type | Common Clock (1x) - (Wired OR) | Common Clock (1x) - (Wired OR) |
| RESPONSE | RS[2:0]# Activation Rule (for transaction N) | 1. One clock after Snoop Phase observation for transaction N, AND<br>2. Three or more clocks after the Response Phase for transaction N-1,<br>AND either of the following:<br>3. If the transaction contains a write data transfer, the request-initiated TRDY# deassertion rules have been met, OR<br>4. if the transaction contains an implicit writeback data transfer, RS[2:0]# for transaction N must be driven exactly one cycle after the Snoop Initiated TRDY# Deassertion Rules have been met and TRDY# has been observed, OR<br>5. if the response to be driven onto RS[2:0]# is "Normal Data Response" then DBSY# is observed inactive, OR<br>6. if the agent response does not require the data bus (no data response, deferred response, retry response, or hard fail response) RS[2:0]# may be driven regardless of the state of DBSY# | 1. One clock after Snoop Phase observation for transaction N, AND<br>2. Two or more clocks after the Response Phase for transaction N-1,<br>AND either of the following:<br>3. If the transaction contains a write data transfer, the request-initiated TRDY# deassertion rules have been met, OR<br>4. if the transaction contains an implicit writeback data transfer, RS[2:0]# for transaction N must be driven exactly one cycle after the Snoop Initiated TRDY# Deassertion Rules have been met and TRDY# has been observed, OR<br>5. if the response to be driven onto RS[2:0]# is "Normal Data Response" then DBSY# is observed inactive and the most recent TRDY# active/DBSY# inactive observation occurred three or more clocks prior to this clock, OR<br>6. if the agent response does not require the data bus (no data response, deferred response, retry response, or hard fail response) RS[2:0]# may be driven regardless of the state of DBSY# |
| | RS[2:0]# Maximum Rate | One per every three clocks | One per every two clocks |
| | RS[2:0]# Signal Type | Common Clock (1x) | Common Clock (1x) |
| | Request Initiated | 1. Minimum of 3 clocks | 1. Minimum of 2 clocks |

-continued

Protocol Change Summary for One Embodiment

| Ph. | Protocol Aspect | P6 Bus | One Embodiment of Enhanced Protocol |
|---|---|---|---|
| | TRDY # Assertion Rule (for transaction N) | from ADS# of transaction N, AND 2. TRDY# has been deasserted on the bus for at least one clock, AND 3. Transaction N is at the top of the In-Order-Queue (IOQ) OR a minimum of one clock after RS[2:0]# for transaction N-1 is driven on the bus | from ADS# of transaction N, AND 2. TRDY# has been deasserted on the bus for at least one clock, AND 3. Transaction N is at the top of the In-Order-Queue (IOQ) OR a minimum of one clock after RS[2:0]# for transaction N-1 is driven on the bus |
| | Request Initiated TRDY# Deassertion Rule | 1. Either inactive DBSY# and active TRDY# are observed for one clock; OR the clock after assertion if DBSY# was observed inactive on the clock TRDY# was asserted AND 2. transaction N is at the top of the IOQ, AND 3. at least 3 clocks from a previous TRDY# deassertion, AND 4. on or before RS[2:0]# activation for transaction N. | 1. Either inactive DBSY# and active TRDY# are observed for one clock; OR the clock after assertion if DBSY# was observed inactive on the clock TRDY# was asserted OR the agent asserting TRDY# for transaction N is asserting DBSY# for transaction n-1 and deasserts DBSY# AND 2. transaction N is at the top of the IOQ, AND 3. at least 3 clocks from a previous TRDY# deassertion, AND 4. on or before RS[2:0]# activation for transaction N. |
| | Snoop Initiated TRDY# Assertion Rule (for transaction N) | 1. Minimum of one clock after the snoop result phase for transaction N has been observed, AND 2. Transaction N is at the top of the IOQ, OR a minimum of one clock after RS[2:0]# for transaction N-1 is asserted on the bus, AND 3. in the case of a request initiated transfer, the request initiated TRDY# active/DBSY# inactive event for transaction N has been observed and TRDY# has been deasserted for at least one clock. | 1. Minimum of one clock after the snoop result phase for transaction N has been observed, AND 2. Transaction N is at the top of the IOQ, OR a minimum of one clock after RS[2:0]# for transaction N-1 is asserted on the bus, AND 3. in the case of a request initiated transfer, the request initiated TRDY# active/DBSY# inactive event for transaction N has been observed and TRDY# has been deasserted for at least one clock. |
| | Snoop Initiated TRDY# Deassertion Rule (for transaction N) | 1. Either inactive DBSY# and active TRDY# are observed for one clock and transaction N is at the top of the IOQ; OR the clock after assertion if DBSY# was observed inactive on the clock TRDY# was asserted, and transaction N is at the top of the IOQ, AND 2. at least 3 clocks from a | 1. Either inactive DBSY# and active TRDY# are observed for one clock and transaction N is at the top of the IOQ; OR the clock after assertion if DBSY# was observed inactive on the clock TRDY# was asserted, and transaction N is at the top of the IOQ, AND 2. at least 3 clocks from a |

-continued

Protocol Change Summary for One Embodiment

| Ph. | Protocol Aspect | P6 Bus | One Embodiment of Enhanced Protocol |
|---|---|---|---|
| | | previous TRDY# deassertion, AND 3. on or before RS[2:0]# activation for transaction N. | previous TRDY# deassertion, AND 3. on or before RS[2:0]# activation for transaction N. |
| DATA | DBSY# Assertion Rule | 1. asserted with RS[2:0]# for a response initiated/implicit writeback data transfer, OR 2. one clock after TRDY# active, DBSY# inactive is observed for a request initiated transfer. | 1. asserted with RS[2:0]# for a response initiated/implicit writeback data transfer, OR 2. one clock after TRDY# active, DBSY# inactive is observed for a request initiated transfer. |
| | DBSY# Deassertion Rule | the same clock or in subsequent clocks after the assertion of the last data transfer (on D[63:0]#) clock | the same clock or in subsequent clocks after the assertion of the last data transfer (on D[63:0]#) clock |
| | DBSY# Signal Type | Common Clock (1x) | Common Clock (1x) |
| | DRDY# Assertion Rule | the clock that valid data is transferred on the bus | the clock that valid data is transferred on the bus |
| | DRDY# Deassertion Rule | any clock during a data transfer phase where valid data is not transferred | any clock during a data transfer phase where valid data is not transferred |
| | DRDY# Signal Type | Common Clock (1x) | Common Clock (1x) |
| | D[63:0]# Signal Type | Common Clock (1x) | Source Synchronous, Quad Pumped (4x) |
| | DP[3:0]# | Not available | Common Clock (1x) |
| | DINV[3:0]# | Not available | Source Synchronous, Quad Pumped (4x) |

*P6 bus documentation includes the Pentium ® Pro and Pentium II Processor System Architecture, by Tom Shanley as well as any of the variety of published works describing the functioning of the P6 bus protocol.

Figure 3A:
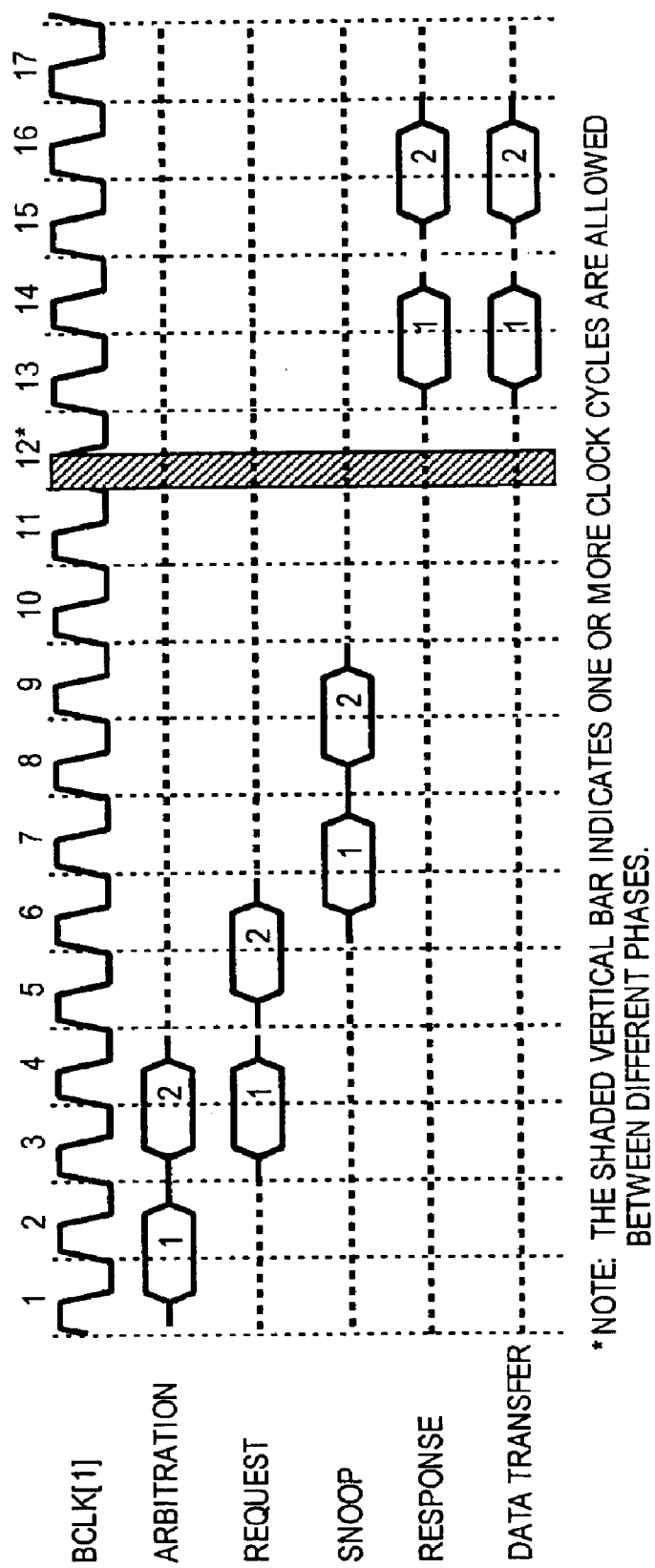
FIG. 3*a* is a timing diagram illustrating example bus transaction phase relationships for two example transactions according to an embodiment.

FIG. 3a is a timing diagram illustrating example bus transaction phase relationships for two example transactions according to an embodiment. The cycles (1, 2, 3, 4, . . . 17) of the bus clock (BCLK [1:0]) are shown at the top. The rectangles having a number 1 indicate various phases for transaction 1, while the rectangles having a number 2 indicate phases for transaction 2. As can be seen from FIG. 3a, the transactions are provided in a pipelined fashion. For example, for transaction 1, arbitration occurs in bus clock cycles 1 and 2, request occurs in cycles 3 and 4, snoop occurs in cycles 6 and 7, and response and data transfer occur in cycles 13 and 14. Thus, it can be seen that a response and data transfer may occur many bus clock cycles after the original request phase. Also, there can be overlap between phases of different transactions. For example, the arbitration phase for transaction 2 occurs at approximately the same time as the request phase for transaction 1.

Figure 3B:
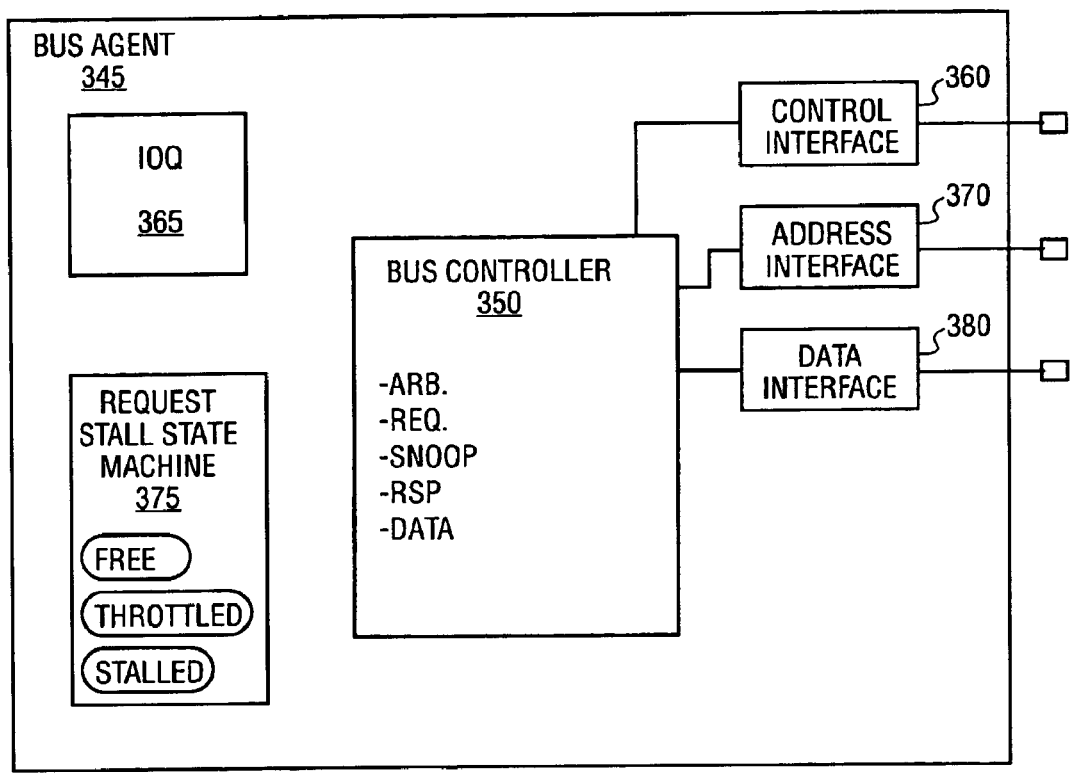
FIG. 3*b* is a block diagram of one embodiment of a bus agent.

An understanding of some of the components of a typical bus agent may assist in understanding the protocol changes of an embodiment. FIG. 3b illustrates an embodiment of a bus agent 345 (may be a processor, chipset, or other bus agent) that implements the described protocols. The bus agent 345 includes, among other things, a bus controller 350, a control interface 360, an address interface 370, and a data interface 380. The bus agent 345 also includes an In Order Queue (IOQ) 365 to support pipelined transactions. The bus agent may also include a snoop queue to track snoop transactions if the agent is a caching agent. The bus agent 345 tracks the number of transactions outstanding, the next transaction to be snooped, the transaction next to receive a response, and whether a transaction was issued to or from the bus agent 345. When a transaction is issued on the bus, it is also entered in the IOQ of each agent. The depth of the smallest IOQ on the bus is the limit of how many transactions can be outstanding on the bus simultaneously. In one embodiment, transactions receive their responses and data in the same order as they were issued. In this embodiment, the transaction at the top of the IOQ is the next transaction to enter the Response and Data Phases. A transaction is removed from the IOQ after the Response Phase is complete.

Other information may be tracked in the IOQ (or a number of queues) as well. For example, the following table indicates additional information that might be tracked.

| Agent | Information |
| --- | --- |
| Request Agents (agents that issue transactions) | How many transactions can this agent continue to issue?<br>Is this transaction a read or a write?<br>Does this bus agent need to provide or accept data? |
| Response Agents (agents that can provide transaction response and data) | Does this agent own the response for the transaction at the top of the IOQ?<br>Does this transaction contain an implicit writeback data and does this agent have to receive the writeback data?<br>If the transaction is a read, does his agent own the data transfer?<br>If the transaction is a write, must this agent accept the data?<br>Availability of buffer resources so it can stall further transactions. |
| Snooping Agents (agents with a cache) | If the transaction needs to be snooped.<br>If the Snoop Phase needs to be extended.<br>Does this transaction contain an implicit writeback data to be supplied by this agent?<br>How many snoop requests are in the queue? |
| Agents whose transactions can be deferred | The deferred transaction and its agent ID.<br>Availability of buffer resources |

V. Signaling Modes

As previously mentioned, in one embodiment, multiple signaling modes and enhanced protocol rules in combination allow a two clock per phase protocol for some transactions. Thus, in one embodiment, the processor bus 117 supports multiple signaling modes so that data and request information may be transmitted at least in some cases in accordance with the two clock per phase protocol. The first is a common clock signaling mode in which all signal activation and sampling or latch points occur with respect to a common bus clock (BCLK#) that is continuously provided between all agents during normal operation. Sampling and driving on the bus clock edge may be approximated by using internal clock signals having convenient rising or falling edges at or near bus clock edges. Such signals may deviate slightly from the external bus clock signal, but do approximately coincide with the bus clock signal and do provide cycle lengths that are substantially equivalent to a cycle of the bus clock signal.

Common clock signals are driven only once by a bus agent per bus clock cycle and are sampled based on the timing of the bus clock rather than specific strobe signals transmitted in conjunction with the signal being generated. The bus clock is typically generated by a clock chip or clock circuit provided on a motherboard, and is common to all processors or agents which communicate on the processor bus. Signal clocking with respect to the common bus clock, regardless of what internal signal(s) is/are used to approximate the bus clock, is referred to as common clock (1x) signaling mode. According to an embodiment, many control signals provided over the control bus are transmitted using the common clock (1x) signaling mode.

A second signaling mode is a multi-pumped signaling mode which allows an information transfer rate that is a multiple of the transfer rate supported by the common clock signaling mode. Thus, according to an embodiment, the multi-pumped signaling mode can support information transfer over the processor bus 117 between agents at a rate that is a multiple of the frequency of the common (i.e., system) bus clock. For example, the multi-pumped signaling mode may provide for example a double pumped signaling mode which allows information (e.g., data, addresses or other information) to be transferred at twice (2x) the rate of the common clock frequency, or may provide a quad pumped signaling mode which provides for information transfer at four times (4x) the bus clock frequency. To facilitate the transfer of information at such rates or frequencies which are greater than the common bus clock, the driving agent also issues or provides a companion signal known as a "strobe" used by the receiver as a reference for capturing or latching the multi-pumped information.

The term asserted means that a signal is driven to its active level (i.e., driven to a zero for an active low signal), and the term deasserted means the signal is driven to its inactive level or released (not driven at all) to its inactive level by other means (e.g., a pull-up resistor or transistor). A driving window for a data or address element is the time during which the element value is asserted on the bus. The square, circle and triangle symbols are used in some timing diagrams described below to indicate when particular signals are driven or sampled. The square indicates that a signal is driven (asserted, initiated) in that clock cycle. The circle indicates that a signal is sampled (observed, latched) in that clock cycle. The circle is typically used to show a sampling point based on a rising (or falling) edge of the bus clock (BCLK) in the common clock (1x) signaling mode. The triangle indicates that a signal is sampled or captured based on a rising or falling edge of a companion signal, termed a "strobe". The strobe may preferably be on or activated only during the transmission of information (e.g., data, addresses, other information) over the processor bus typically in a multi-pumped mode.

A. Common Clock Signaling Mode

According to an embodiment of the common clock (1x) signaling mode, all agents on the processor bus 117 drive their active common clock outputs and sample common clock inputs relative to a bus clock signal. According to an embodiment, each common clock input to be sampled should be sampled during a valid sampling interval on (e.g., prior to) a rising edge of the bus clock, and its effect or result be driven out onto the bus 117 no sooner than the next rising bus clock edge. This example approach allows one full bus clock cycle for inter-component communication (signal transmission and propagation) and at least one full bus clock cycle at the receiver to interpret the signals and compute and output a response. As a result, after an agent drives data onto the processor bus in one or more bus clock cycles, there is a pause of one bus clock cycle (e.g., a dead cycle or inactive cycle) before another agent can drive the processor bus 117. A setup time for a receiving latch may slightly reduce the time for inter-component communication.

Figure 4:
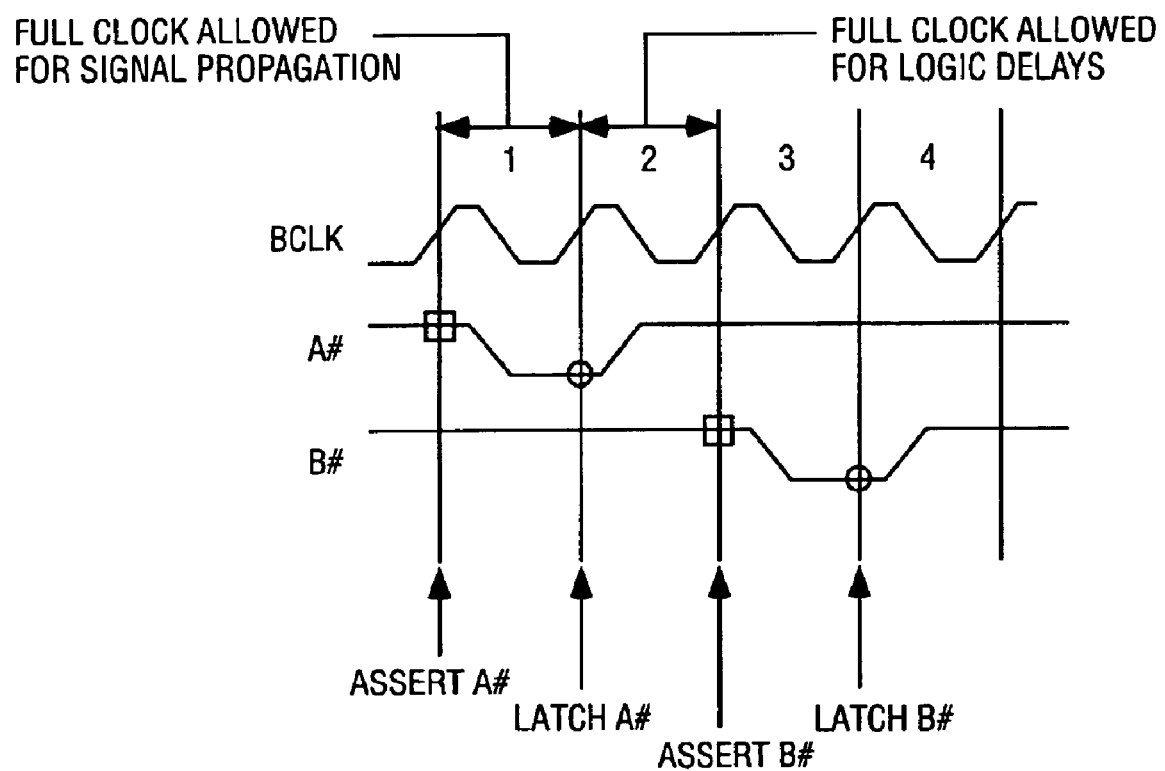
FIG. 4 is a timing diagram illustrating operation of the common clock signaling mode according to one embodiment.

FIG. 4 is an example timing diagram illustrating an example operation of the common clock (1×) signaling mode according to an embodiment. The signals are shown as they appear on the processor bus 117. Four cycles of the bus clock (BCLK) are shown. Two additional example signals are also shown, including A# and B#, which may be any common clock signals. For example, A# may be a first control signal from a first agent, while B# may be a second signal from a second agent. The first and second control signals may be provided as part of a handshake or bus protocol, for example.

As shown in FIG. 4, the signal A# is driven (or asserted) at the rising edge of clock cycle 1 (as shown by the square in A#), and is latched at the receiver at a rising edge at the beginning of bus clock cycle 2 (as shown by the circle for A#). Thus, the value of A# at the end of cycle 1 is sampled (at the rising edge of the clock), and clock cycle 1 is provided for signal propagation. While A# is asserted at the beginning of cycle 1, it is not observed on the bus until the beginning of cycle 2. Then, there is a pause or inactive clock cycle (during bus clock cycle 2 for logic delays and for the receiver to interpret the signals). The receiver then drives or asserts the B# signal at the beginning of bus clock cycle 3 (as shown by the square for B#), which are observed and captured by the other agents at the beginning of cycle 4 (as shown by the circle for B#).

B. Multi-Pumped Signaling Modes

In many instances, the length of processor bus 117, electrical limitations (including the latency for signal propagation across the bus) may preclude, or make difficult and/or expensive increasing the processor bus frequency. Therefore, according to an embodiment, rather than increasing the entire processor bus clock frequency, the multi-pumped signaling protocol increases the data transfer rate (over the common clock signaling mode) by operating the appropriate bus signal group (e.g., address bus or data bus) at a multiple of the frequency of the bus clock (BCLK).

1. An Example of a Quad Pumped Signaling Mode

In the quad pumped signaling mode, the appropriate bus signal group is operated at four times (4×) the frequency of the bus clock (BCLK). In other words, in quad pumped signaling mode, four elements of information are driven onto the processor bus 117 in one bus clock cycle (which is the time it would take to drive one element of information in the common clock or 1× signaling mode).

Figure 5A:
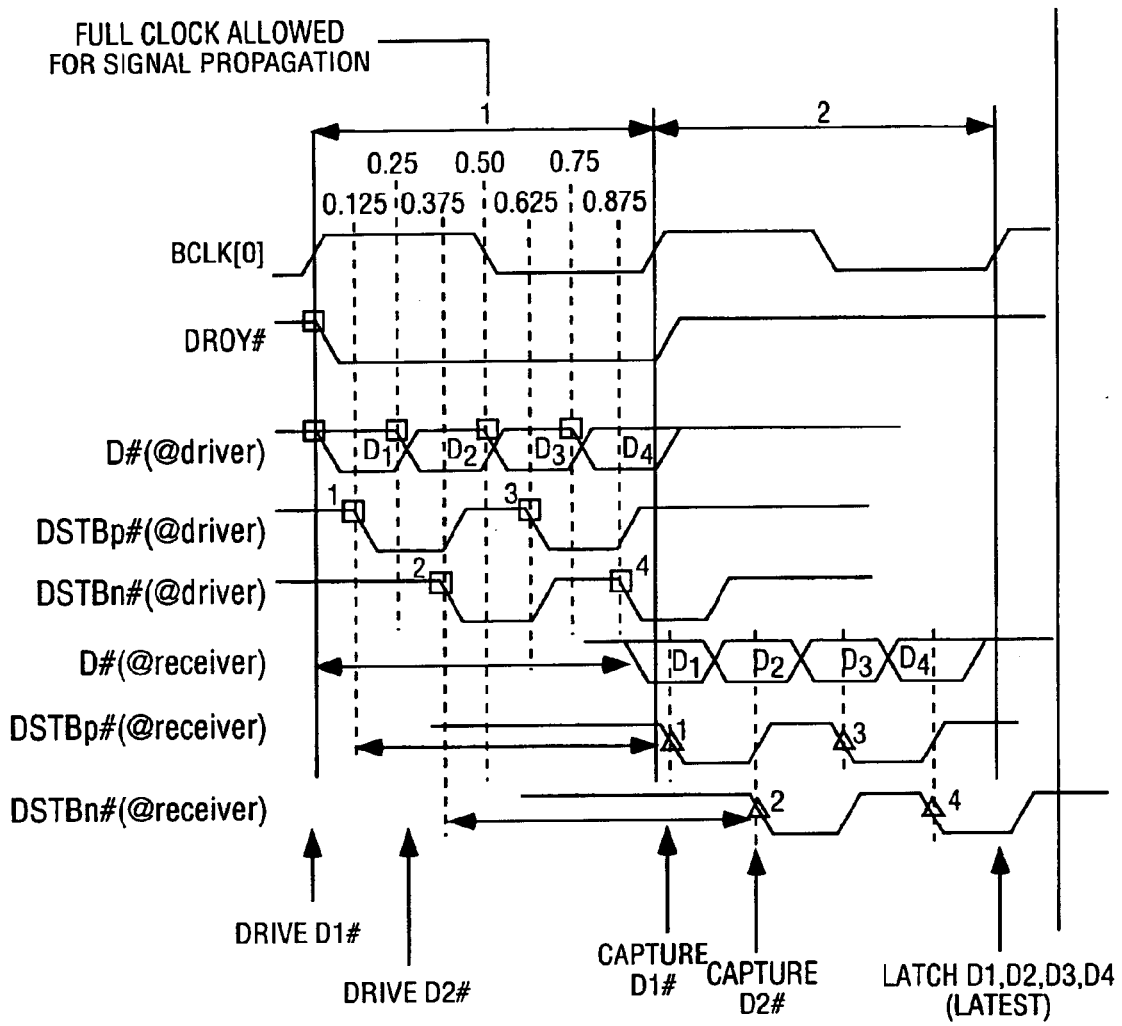
FIG. 5*a* is a timing diagram illustrating operation of a quad pumped signaling mode according to one embodiment.

FIG. 5a is a timing diagram illustrating operation of an example quad pumped signaling mode according to an embodiment. Although the quad pumped signaling mode can be used for any type of signals, the quad pumped signaling protocol is used to transmit data according to an example embodiment. Two bus clock cycles and a portion of a third bus clock cycle are shown in FIG. 5a. In one embodiment, a worst case flight time (or signal propagation time) across the processor bus 117 is such that a second information element may be driven onto the processor bus 117 at the driver (i.e., the agent driving information onto the processor bus) before the first information element has been latched at the receiver (receiving agents). In some embodiments, the worst case flight time is less than one bus clock cycle so that the multi-pumped bus may be promptly turned around or used by the receiving agent.

According to an embodiment, the driver (or driving agent) sends or drives (generates) a new information element at approximately the start, and approximately the 25%, 50% and 75% points of a signal generation time period. These information elements may be generated from internal clocks of the driving agent and thus may not be precisely aligned with the bus clock signal at any point. Thus, the bus clock signal in FIG. 5a is intended to illustrate a signal generation time period that is equivalent to one cycle of the bus clock. In some embodiments, the elements are driven with only fairly precise relationships to the other elements and strobes and with a less precise relationship to the bus clock. In fact, in some embodiments, the amount of delay from the bus clock is only limited by the requirement that the receiver receive the data within one setup time of the end of the bus clock cycle following the bus clock cycle in which the transfer began. In such embodiments, a shorter flight time to the receiver allows further deviation from alignment of information element generation to the rising edge of the bus clock. In other embodiments, there may be a closer correlation to the bus clock (BCLK), and information elements may be driven at approximately the rising edge and approximately the 25%, 50% and 75% points of a bus clock cycle. Keeping the information elements more closely aligned to the bus clock may allow a system to be designed to have a greater flight time from the generating bus agent to the receiving bus agent.

The driver also sends a companion timing signal known as a data strobe signal that indicates when the receiver should sample or capture the data. The strobe signal is preferably sent or driven (activated) only when information is sent using the multi-pumped signaling mode. Because the data and the strobe signals are generated by the same driver or source, the data and strobes will have the same path. As a result, the strobe signal and the data signals should have the same path and therefore approximately the same delay. Therefore, an advantage achieved by the driver or source sending both a strobe and data is that the data signals and the strobe signal will arrive in-phase (or synchronous) at each agent on the bus 117. Thus, this technique of a driver sending both the data and a timing strobe signal can be referred to as a source synchronous transfer.

In the quad pumped signaling mode, four data strobes (e.g., four timing strobe edges) may be used to identify an information sampling or capture point) in each bus clock cycle, one for each of the four data elements. Unfortunately, problems may arise in generating a strobe signal at relatively high frequencies. At high clock speeds, the difference between the rising edge rate and the falling edge rate can be significant. In addition, it may be difficult to provide a clock signal or strobe signal having a 50% duty cycle. As a result, at some high clock frequencies, using both the rising edge and falling edge of the strobe signal to identify sampling points may create asymmetry or introduce a degree of timing uncertainty. Instead, it may be advantageous to use only one of the two edges of the strobe (i.e., use only the rising edges or only the falling edges of the strobe signals for sampling or capturing the quad-pumped data) to obtain more symmetric or uniform strobe timing or sampling intervals.

Using only one of the edges of the strobe would typically require a clock frequency that is a multiple of the bus clock frequency. In the case of quad pumped data (four data elements per bus clock cycle), the strobe signal frequency should be four times (4×) the bus clock frequency if only one edge is used for timing.

Unfortunately, such high multiples may lead to strobe signals that are much more prone to noise and distortion, which could affect the alignment of the data and strobe at the receiver. Such a misalignment between the transmitted strobe signal and the transmitted data may cause the receiver to capture bad or incorrect data. In addition, signal attenuation can be significantly higher at such high frequencies.

Therefore, according to an embodiment, multiple data strobe signals are used to provide the four strobes per bus clock cycle without using a strobe frequency that is four times (4x) the bus clock frequency. According to an embodiment, two data strobe signals (DSTBp# and DSTBn#) are provided each at twice the frequency of the bus clock. Thus, if the bus clock frequency is 100 MHz, the two data strobe signals will each have a frequency of 200 MHz when activated or generated by the driver (or driving agent). Alternatively, four data strobe signals could be used (each at the same frequency as the bus clock when activated) each providing one strobe or falling edge per bus clock cycle.

Referring again to the timing diagram of FIG. 5a, the driver sends or drives a new information or data element at approximately the rising edge, and the 25%, 50% and 75% points of the signal generation time period (bus clock cycle 1). The data elements are labeled as D1, D2, D3 and D4 for the four data elements in this example. This embodiment also uses two data strobe signals, including DSTBp# and DSTBn#. According to an embodiment, the two data strobe signals are generated out of phase from each other (or in a staggered or offset arrangement). This allows one of the strobe signals to identify sampling points for the odd data elements (e.g., D1, D3, D5, . . . ) and the other strobe signal to be used for the even data elements (e.g., D2, D4, D6, . . . ). The strobes may also be complementary or differential strobes.

Although only two strobe signals are shown in the example of FIG. 5a, any number of strobe signals can be used to identify sampling points for the data of a source synchronous transfer. As noted above, it can be advantageous to provide multiple strobe signals so that only one of the two edges of the strobe signals can be used to identify sampling points (or strobes) while lowering the frequency of the strobe signals. For example, if a 6x pumped protocol were used (instead of quad pumped), three strobe signals could be used, where all three strobe signals could be similarly offset or staggered such that strobe 1 could be used for data elements D1 and D4, strobe 2 for data elements D2 and D5 and strobe 3 for data elements D3 and D6, etc.

According to an embodiment, only one of the two edges of the strobe signals are used for identifying or synchronizing data sampling points. In this particular embodiment, only the falling edges of the two data strobe signals are used to identify points for sampling the information or data. The data strobes (or falling edges of the data strobe signals) are centered in each of the four information or data elements. Thus, the four falling edges (or strobes) of the data strobe signals will occur at approximately the 12.5%, 37.5%, 62.5% and 87.5% points of the signal generation time period, which may be the bus clock (BCLK) cycle. Therefore, the two strobe signals provide equally spaced strobes or falling edges that are substantially centered on data elements (i.e., the data element driving window). Such an approach may advantageously allow simplified delay matching for strobe and data elements. Since the strobe is properly positioned to latch the generated data, board traces and input circuitry can be designed to be identical (or as close thereto as practical) to help preserve the strobe and data timing relationship until the strobe is used to capture the data.

As shown in FIG. 5a, a DRDY# signal is driven onto the bus 117 at the beginning of bus clock cycle 1 (as shown by the square for DRDY#). DRDY# indicates that valid data has been placed on the processor bus 117 to be sampled or captured. The first data element (D1) is driven by the driver onto the processor bus 117 at the rising edge of bus clock cycle 1 (as shown by the first rectangle for D# (@driver)).

A first data strobe signal (DSTBp#) is then activated by the driver at the 12.5% point of the signal generation time period (which is equivalent to one bus clock cycle), as shown by the first square in DSTBp# (@driver). Thus, the strobe (or falling edge) for the first data element (D1) is centered in the first data element. Once a strobe signal has been activated or turned on, it typically continues activated (continues switching) until the all data elements for that transaction have been driven onto the bus. For simplicity, these strobe transitions are shown with respect to the bus clock signal, however, as previously discussed, they may not be precisely oriented to the bus clock cycles in some embodiments, but rather may be oriented to a signal generation time period of the same duration as a bus clock cycle, which may be offset from the bus clock cycles.

Also, a second data element is driven by the driver at approximately the 25% point of the bus clock cycle 1, as shown by the second rectangle for D# (@driver). The second data strobe signal (DSTBn#) is activated at approximately the 37.5% point of bus clock cycle 1 and provides a falling edge (or strobe) that is centered in the second data element (D2).

Likewise, the third and fourth data elements (D3 and D4, respectively) are driven at approximately the 50% point and the 75% point of bus clock cycle 1. Corresponding data strobes (falling edges of the data strobe signals) are driven or provided by the driver at approximately the 62.5% point (by the DSTBp# strobe signal) and approximately the 87.5% point (by the DSTBn# strobe signal). Because the data strobe signals are provided at a frequency that is two times (2x) the frequency of the bus clock, each data strobe signal will provide a strobe or falling edge twice every bus clock cycle. Thus, the DSTBp# strobe signal provides falling edges or strobes at approximately the 12.5% and 62.5% points of the bus clock cycle, while the DSTBp# strobe signal provides falling edges or strobes at approximately the 37.5% and 87.5% points of the bus clock cycle.

Thus, it can be seen that the two data strobe signals (DSTBp# and DSTBn#) are staggered or out of phase with each other. This allows alternating strobe signals to provide a falling edge (or strobe) every quarter of a bus clock cycle (between both data strobe signals). This provides four strobes or falling edges per bus clock cycle for identifying sampling or capturing points for the four data elements per bus clock cycle, while decreasing the frequency of each strobe. Moreover, timing and circuitry is simplified because the same edge (in this example the falling edge) is used as the strobe in each data strobe signal.

According to an embodiment, to ensure correct operation, the latency of the information transfer from the driving agent to any receiver should be less than or equal to one bus clock minus the input latch setup time. This will avoid contention on the data lines for the subsequent data phase if the receiver becomes the bus owner during the next phase.

FIG. 5a also shows the capturing of the data at the receiver. After the signals (data and data strobes) are driven by the driver, these signals propagate down the processor bus 117 and reach the target or receiver. The first data element is received at the receiver, as shown by the D# (@receiver) signal. The first data element (D1) is sampled or captured on the first strobe, which is the first falling edge of DSTBp# (@receiver). The first triangle for the DSTBp# (@receiver) identifies the strobe or point for sampling or capturing the first data element, and the second triangle for the DSTBp# (@receiver) identifies a point or strobe for sampling the third data element at the receiver. Likewise, the two triangles for the second data strobe signal (DSTBn#

(@receiver)) identify the points for the receiver to sample or capture the second and fourth data elements (D2, D4).

As shown in FIG. 5a, the first data element D1 may be sampled or captured (strobed) into the receiver after the rising edge at the beginning of clock 2, and no sooner than the 12.5% point of clock cycle 2 (the next clock cycle). The actual time at which these signals are captured at the receiver varies depending on the flight time from the driver to the receiver. As used herein, the terms "capturing", "sampling" and "latching" are loosely used to mean approximately the same thing. However, the data for all data elements may not be latched into the receiver until the rising edge of bus clock cycle 3 in some embodiments. Thus, while the data element D1 is received and captured near the beginning of bus clock cycle 2, all the data is not made available to the receiver until the beginning of bus clock cycle 3. The receiving agent may include a FIFO (first in, first out) buffer that is sufficient to store eight data elements. The eight data element FIFO is large enough to store the four elements of one data transfer and the next four elements for the next transfer. This allows four new data elements to be received and captured while the previous four data elements are being popped or latched out from the FIFO to the receiver. The net effect is four times the bandwidth of the common clock signaling mode with the effect of adding latency for the first signal group latched inside the receiver or device.

In addition, according to an embodiment, multiple lines are used to carry multiple copies of each of the two data strobe signals (DSTBP# and DSTBn#). According to an embodiment, there are four DSTBn# signals and four DSTBp# signals, as expressed in the following table.

Example Embodiment of Data Strobe Coverage

| Type | Signal Names | Number |
| --- | --- | --- |
| Data Ready | DRDY# | 1 |
| Data Bus Busy | DBSY# | 1 |
| Data Strobes | DSTBp[3:0]# DSTBp[3:0]# | 8 |
| Data | D[63:0]# | 64 |
| Data Inversion | DINV[3:0]# | 4 |
| Data parity | DP[3:0]# | 4 |

The four DSTBp# signals are logically identical, as are the four DSTBn# signals, but each of the data strobe signals is physically routed with a subset of the request signals (i.e., a subset of the data lines) to reduce timing skew or misalignment between the data and the data strobe signals.

Figure 5B:
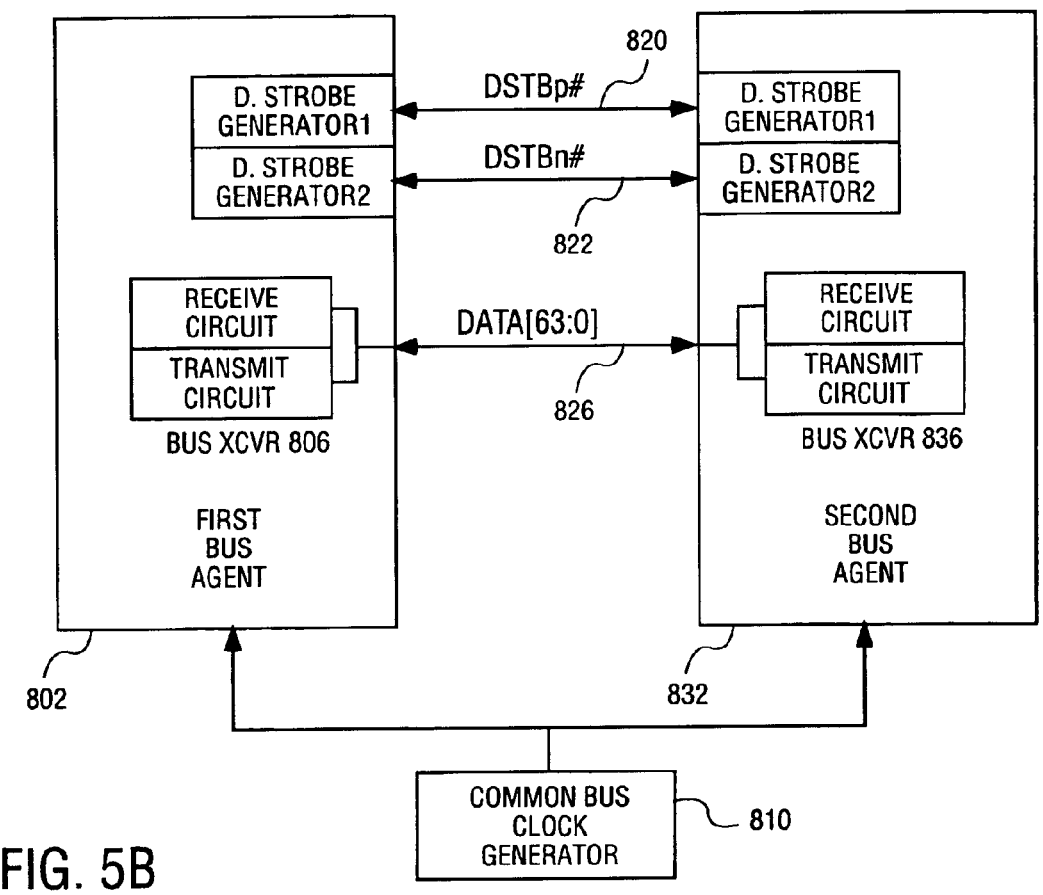
FIG. 5*b* is a block diagram of an apparatus for multi-pumped transfer of information between agents according to an embodiment.

FIG. 5b is a block diagram of an apparatus for transferring information between agents according to an embodiment. A first bus agent 802 is connected to a second bus agent 832. The first bus agent 802 includes a data strobe generator 1/receiver 1 for generating and receiving a first data strobe signal (e.g., DSTBp#) over a first bidirectional data strobe signal line 820, and a data strobe generator 2/receiver 2 for generating and receiving a second data strobe signal (e.g., DSTBn#) over a second bidirectional data strobe signal line 822. Bus agent 802 also includes a bus transceiver 806 including a transmit circuit for transmitting or driving data signals onto the data bus or data signal lines 826 and a receive circuit for receiving data signals received over the data signal lines 826. The second bus agent 832 similarly includes a data strobe generator 1 and a data strobe generator 2 for generating two data strobe signals onto the data strobe signal lines 820 and 822, respectively. A common (or system) bus clock generator 810 provides the common or system bus clock to bus agents 802 and 832.

2. Matching the Speed of the Address Bus to the Data Bus

According to one embodiment, the cache line size has been increased to 64 bytes (the cache line size in some Pentium® processors is 32 bytes.). Thus, using the quad pumped signaling protocol and a data bus width of 64 data lines, a cache line (or 64 bytes) can be transmitted or transferred in two bus clock cycles:

64 bytes=(2 cycles)×(4 pumps/cycle) (8 bytes per pump).

However, in some Pentium® processors, a request (including an address) is transferred in three bus clock cycles. The three bus clock cycles for the request phase for some Pentium® processors included the following:

Cycle 1—sub-phase a—address (provided over the address bus), and a type of request (e.g., read, write).

Cycle 2—sub-phase b—auxiliary details for the request, including byte enables, length, etc (provided over the address lines or address bus).

Cycle 3—a dead cycle or turnaround cycle which allows signals on the bus to quiet down to allow another agent to drive the bus.

Thus, according to one embodiment, data for a cache line can be transferred over the data bus in two bus clock cycles. However, in some Pentium® processors, the address and request timing requires three bus clock cycles for transferring a request. Thus, in some Pentium® processors, the address bus timing or bandwidth does not match the speed of the improved quad pumped data bus as described in the above embodiment (see FIG. 5a). One of the more scarce and valuable resources is the data bus width and data bus bandwidth. Thus, according to an embodiment, it may be preferable for the data bus bandwidth to throttle or limit the processor bus, not the address bus bandwidth. Therefore, to prevent the address bus from slowing down or throttling the processor bus, it may be desirable to adjust the address and request timing on the address bus to at least match the bandwidth or speed of the data bus (in this example, for the transmission of one cache line on the data bus).

Therefore, according to an embodiment, the timing and speed of the request phase provided over the address bus was adjusted to match the overall speed of the data bus. It may be desirable to maintain the dead cycle or turnaround cycle. Thus, according to an example embodiment, the address bus was double pumped to provide two information elements (sub-phase a and sub-phase b of the request) in one bus clock cycle.

3. An Example of a Double Pumped Signaling Mode

Figure 6A:
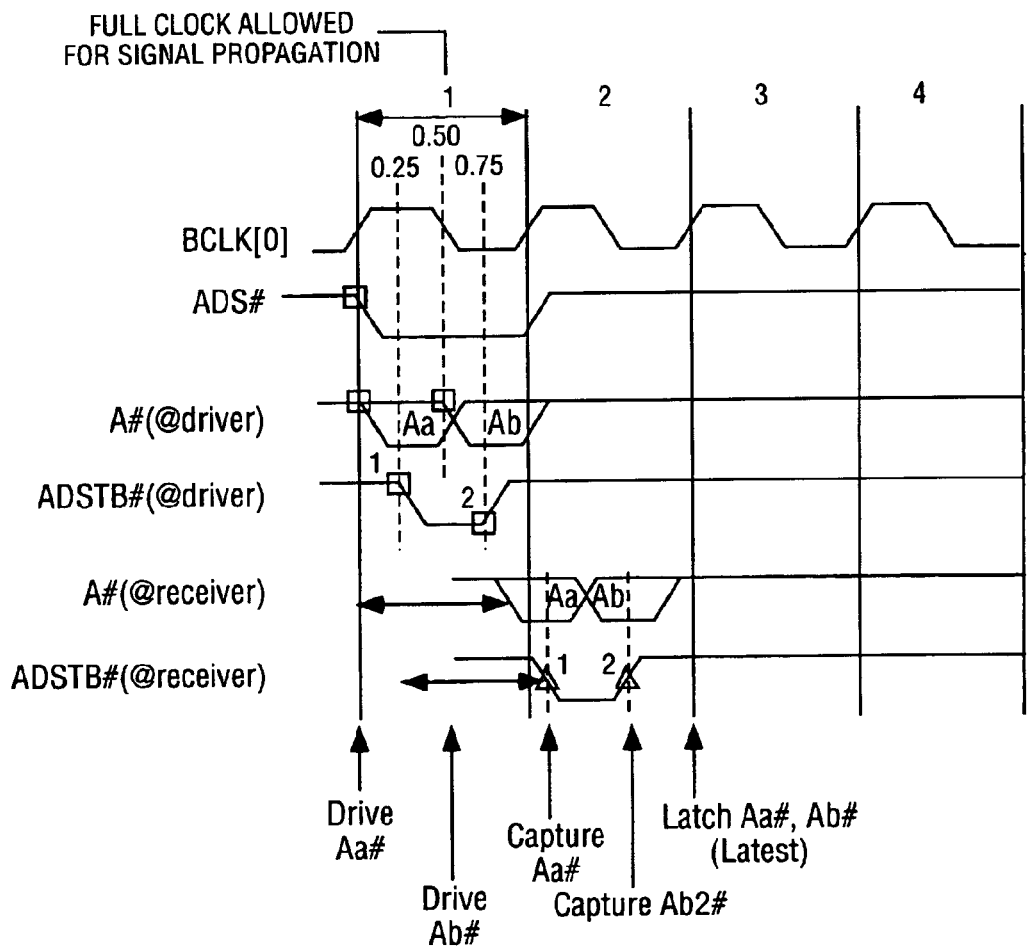
FIG. 6*a* is a timing diagram illustrating operation of an example double pumped signaling mode according to an embodiment.

In general, according to an embodiment, a double pumped signaling mode operates the appropriate bus signaling group at twice (2×) the frequency of the bus clock (BCLK). FIG. 6a is a timing diagram illustrating operation of an example double pumped signaling mode according to an embodiment. While any signals may be double pumped, the address and request bus is double pumped in this embodiment.

Referring to FIG. 6a, the ADS# signal goes low at the beginning of the request phase. In the double pumped signaling mode, two elements of information are driven onto the bus in the time that it takes to drive one element using the common clock signaling mode (i.e., during a time period equivalent to one bus clock cycle). Due to flight time (or signal propagation time on the processor bus 117), the second signal group or information element may be driven at the driver before the first element is latched at the receiver(s). According to an embodiment, the driver sends a new information element at approximately the rising edge and the 50% point of the bus clock cycle. As discussed previously with respect to quad-pumped data transfer, in some embodiments, the bus clock signal is used to illustrate a signal generation time period. The multiple address/request elements are transferred in a duration equivalent to a bus clock cycle. For convenience, percentages are given relative to the bus clock signal; however, these may in some embodiments be relative only to a signal generation time period which may vary in its precise relation to the bus clock. Additionally, percentages given are approximate as some variation may be expected.

As shown in FIG. 6a, sub-phase a of the request (Aa) providing the transaction address is sent on the first half of bus clock cycle 1 beginning at approximately a rising edge at the beginning of bus clock cycle 1. Sub-phase b of the request (Ab) providing some auxiliary details for the transaction is sent on the second half of bus clock cycle 1 beginning at approximately the 50% point of bus clock cycle 1. These two information elements are shown in FIG. 6a as the two rectangles for Aa and Ab for the A# (@driver) lines (Aa indicates sub-phase a of the request provided over the Address lines, while Ab indicates sub-phase b of the request provided over the Address lines). Thus, the address bus is double pumped because two information elements (Aa and Ab) are transferred or sent during one bus clock cycle.

In addition, because the information for the request will be sent using a double pumped signaling mode (two information elements per bus clock cycle), the information is preferably sent as a source synchronous transfer. Thus, in addition to the two information elements, the driver also drives or activates an address strobe to provide two address strobes (transitions) per bus clock cycle (when activated). The address strobes provide or identify points for sampling the two information elements (Aa and Ab) sent on the address bus.

According to an embodiment, an address strobe signal (ADSTB#) is used that is the same frequency as the bus clock (BCLK). However, to provide two strobes during the one bus clock cycle, both falling edges and rising edges of the address strobe signal are used as strobes or to identify sampling points for the two information elements provided over the address bus. As shown in FIG. 6a, the driver activates an address strobe signal (ADSTB#) at approximately the 25% point of bus clock cycle 1, which is the center of information element 1 (Aa). According to an embodiment, the address strobe for the first information element (Aa or sub-phase a of the request) is provided as the falling edge of the ADSTB# signal (driven at the 25% point of bus clock cycle 1), while the address strobe for the second information element (Ab or sub-phase b of the request) is provided as the rising edge of the ADSTB# signal (driven at approximately the 75% point of bus clock cycle 1).

Even though the address strobe has a frequency that is the same as the bus clock, the bus clock is not used in some embodiments as the strobe signal for the information elements because the bus clock signal may not provide rising and falling edges at the appropriate times. Moreover, the bus clock signal is always activated (as opposed to a strobe signal that is activated only during a source synchronous transfer). The address strobe signal is used to provide strobes or sampling points for the two information elements because the address strobe signal can be activated (turned on) and de-activated (turned off) regardless of the state or phase of the bus clock. By having the strobe driven from the same source as the information, the delay in the strobe matches the delay in the information, and hence allows more than one bit to be on a wire at the same time.

The information elements (Aa and Ab) and the address strobe signal propagate along the processor bus 117 and may arrive at the receiver at the beginning of bus clock cycle 2 (timing of the arrival will vary depending on the flight time of the system). As shown in FIG. 6a, the first information element (Aa) is captured or sampled on the falling edge of the ADSTB#(@receiver) signal and the second information element is captured or sampled on the rising edge of the ADSTB#(@receiver) signal, as shown by the two triangles on the ADSTB#(@receiver) signal. Thus, it can be seen that the receiver deterministically captures the data or information based on an indication from the driver when the data is valid (and should be captured).

According to an embodiment, the latency of the data transfer from the driving agent to any receiver should be less than or equal to one bus clock cycle minus the input latch setup time. This should avoid contention on the address lines (or address bus) and other lines for the second or subsequent phase if the receiver becomes owner of the next phase. The net effect is twice the bandwidth of common clock signaling mode with the possible effect of adding latency for the first signal group being latched inside the component or receiver.

According to an embodiment, the receiver includes a four element FIFO buffer for storing four information element transmitted over the address bus during the request phase. This allows elements from sub-phase a and sub-phase b of one request to be received and captured in the FIFO, while allowing at the same time elements from a sub-phase a and a sub-phase b of a previous request to be read out of the FIFO and latched at the receiver.

Therefore, according to an embodiment, a single address strobe signal is used at the same frequency as the bus clock to provide the strobes for the two information elements transferred over the address bus. At these frequencies for the address strobe (the same frequency as the bus clock signal), signal attenuation is not a problem. Moreover, any asymmetry in the strobe duty cycle does not pose a problem because only two information elements are transmitted per bus clock cycle. Hence, a single address strobe at the same frequency as the bus clock in which both falling and rising edges are used as strobes can be used for the address strobe signal. In some embodiments, the single address strobe may be duplicated. For example, one embodiment may use a first address strobe for address signals A[35:24] and a second substantially identical address strobe for A[23:3] and REQ [4:0].

Alternatively, multiple (or two) different address strobe signals can be used, with only one of the edges of each address strobe signal being used as a strobe. For example, a first address strobe signal activated (having a falling edge) at approximately the 25% point of cycle 1 and a second address strobe signal activated (having a falling edge) at approximately the 75% point of cycle 1 could be used. Thus, the activation points of the two address strobe signals would be offset or staggered. Because only two elements are driven during one bus clock cycle, the frequency of the address strobe signals could be chosen to be the same as the bus clock frequency, or another frequency.

Figure 6B:
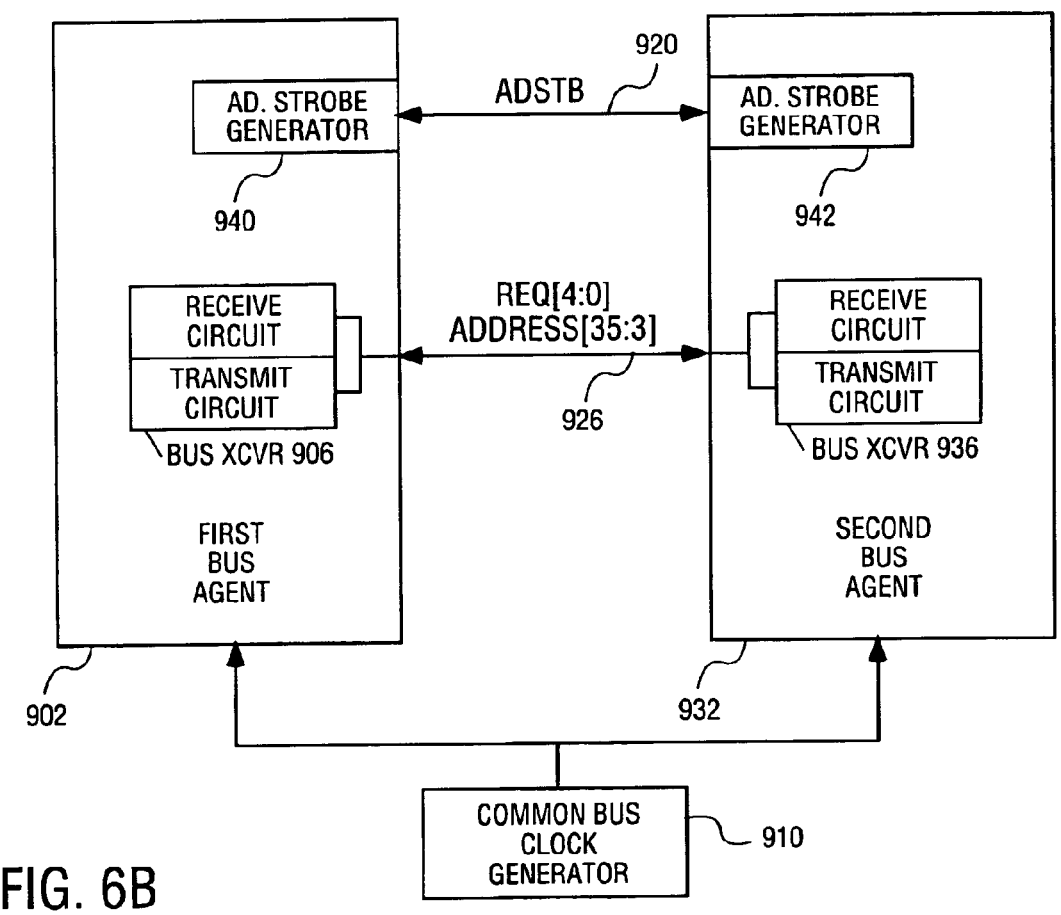
FIG. 6*b* is a block diagram of an apparatus for multi-pumped transfer of information between agents according to an embodiment.

FIG. 6b is a block diagram of an apparatus for transferring information between agents according to an embodiment. A first bus agent 902 is connected to a second bus agent 932. The first bus agent 902 includes an address strobe generator/receiver for generating and receiving a first address strobe signal (e.g., ADSTB[1]#) over a first bidirectional address strobe signal line 920. Bus agent 902 also includes a bus transceiver 906 including a transmit circuit for transmitting or driving address and request signals onto the address and request bus or address bus signal lines 926 and a receive circuit for receiving data signals received over the address signal lines 926. The second bus agent 932 similarly includes an address strobe generator an address strobe signal onto the address strobe signal line 920. A common (or system) bus clock generator 910 provides the common or system bus clock to bus agents 902 and 932.

As described above, a data transfer of one cache line can be transmitted in two bus clock cycles using the quad pumped signaling mode, and an address request can be transmitted in two bus clock cycles using the double pumped signaling mode. Thus, both the address bus and the data bus have the same peak throughput, which provides a balanced processor bus. Unless otherwise noted, most if not all of the remaining signals are transmitted using the common clock (1×) signaling mode.

VII. Retuning the Bus Protocol to the New Beat Rate of 2 Clock Cycles

As described above, in one embodiment, a bus agent provides increased request and data bandwidth through the use of multi pumped signaling protocols. In one embodiment, this increase in request bandwidth (on the address bus) and data bandwidth (on the data bus) is done without increasing the data bus width (64 lines), without using an expensive clocking or routing topology, and while maintaining a similar type of bus protocol as used in some previous Pentium® processors.

According to an embodiment, the cache line was increased to 64 bytes, and a quad pumped signaling mode (transmitting 32 bytes per bus clock cycle) can be used to send a 64 byte cache line in two bus clock cycles. According to an embodiment of the invention, a double pumped signaling mode is used on the address bus to transfer or transmit both sub-phases a and b of the request in a single bus clock cycle. This reduces the length of the request phase to two bus clock cycles, which matches the length of a cache line transfer (also two bus clock cycles). Thus, because a request phase has a length of two bus clock cycles and a cache line transfer requires two bus clock cycles, the beat rate or beat frequency for this embodiment may generally be considered to be two bus clock cycles.

Figure 7:
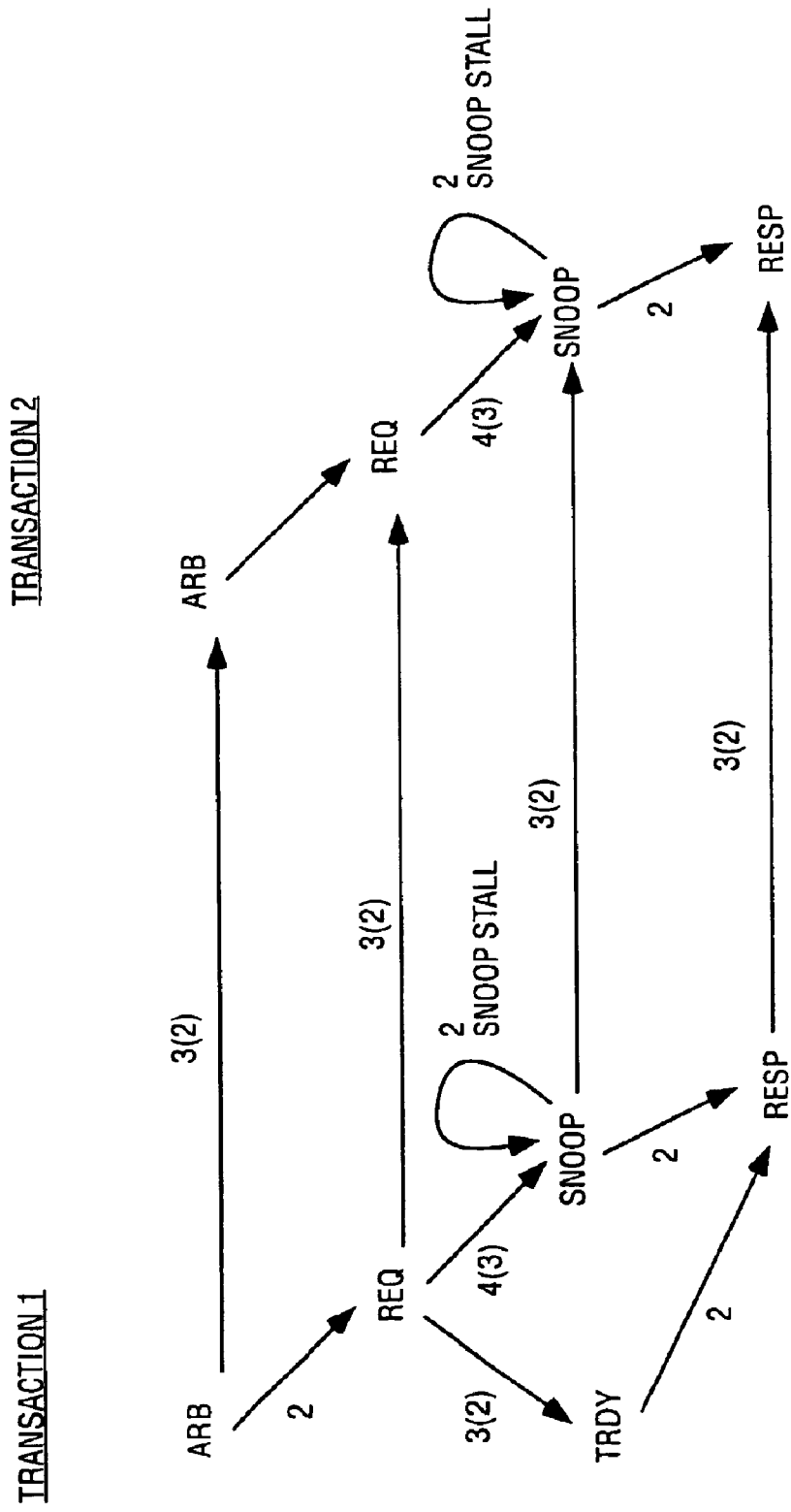
FIG. 7 is a diagram illustrating a minimum latency or delay between transaction phases for one embodiment.

According to an embodiment of the invention, the bus protocol was retuned or modified to adjust the latency or delay between the beginning of successive phases to more closely match the new beat frequency of two bus clock cycles for the processor bus. FIG. 7 is a diagram illustrating the minimum latency or delay between transaction phases for one embodiment (including arbitration, request, snoop and response phases). Arbitration (Arb), request (Req), snoop and response (Resp) phases are shown for two transactions (transaction 1 and transaction 2). Numbers are shown to indicate a latency or delay between phases. The first number indicates the minimum number of bus clock cycles between the beginning of phases as implemented in some Pentium® processors, while the second number (which is in parentheses) indicates a new minimum latency between phases after the bus protocol was adjusted or retuned to more closely match the new beat frequency of two bus clock cycles for one embodiment. If only one number is shown, this indicates that there is no change in the delay or latency between phases as between some Pentium® processors and an embodiment.

As noted above, the minimum latency between the phases shown in FIG. 7 is typically two bus clock cycles. Referring to FIG. 7, the minimum latency between the beginning of an arbitration phase and the beginning of a request phase for a transaction (e.g., transaction 1) remains unchanged at two bus clock cycles. The minimum latency from the beginning of a request phase to the beginning of a snoop phase of a transaction has been decreased from four bus clock cycles to three cycles. The minimum latency between the beginning of a snoop phase to the beginning of a response phase remains unchanged at two bus clock cycles. The minimum latency between the beginning of the request phase and when a target agent can assert the TRDY# signal has been decreased from three to two bus clock cycles. The minimum latency from assertion of the TRDY# signal to the beginning of the response phase remains unchanged at two bus clock cycles.

In addition, the minimum latency between the same or corresponding phases of successive transaction has been modified to more closely match the beat frequency of two clock cycles. Referring to FIG. 7 again, the minimum latency between successive arbitration phases (e.g., minimum latency between beginning of arbitration phase of transaction 1 and the beginning of arbitration phase of transaction 2) has been decreased from three bus clock cycles to two cycles. The minimum latency between successive request phases has been decreased from three bus clock cycles to two. The minimum latency between successive snoop phases has been decreased from three bus clock cycles to two. And, the minimum latency between successive response phases has been decreased from three bus clock cycles to two.

Each of the phases will be described along with a brief explanation of some changes or modifications to the bus protocol for that phase. These changes may be employed in various embodiments to contribute to or compensate for changes in latency.

1. Arbitration Phase

Typically, no transactions can be issued until the bus agent owns the processor bus 117. In one embodiment, a transaction includes an arbitration phase if the agent that wants to drive the transaction onto the processor bus 117 does not already own the bus 117. The arbitration phase may be omitted if an agent is already a bus owner and intends to continue driving the bus. According to an embodiment, a bus arbitration protocol is provided that supports two classes of bus agents: symmetric agents, and priority agents. Processors on bus 117 typically arbitrate as symmetric agents. The priority agent (e.g., system interface 116) usually arbitrates on behalf of the I/O subsystem (I/O bridge 124 or I/O agents) and the memory subsystem (memory agents located in the main memory subsystem 122).

An example signal group which can be used to arbitrate for bus ownership is shown below (As used herein, the # sign indicates active low signals):

EXAMPLE ARBITRATION SIGNALS

| Pin/Signal Name | Pin Mnemonic | Signal Mnemonic |
| --- | --- | --- |
| Symmetric Agent Bus Request | BR[3:0]# | BREQ[3:0]# |
| Priority Agent Bus Request | BPRI# | BPRI# |
| Block Next Request | BNR# | BNR# |
| Lock | LOCK# | LOCK# |

The processor bus 117 allows a plurality of agents to simultaneously arbitrate for the bus 117. The symmetric agents arbitrate for the bus 117 based on round robin rotating priority scheme. The arbitration scheme provides fair access to a request phase for all symmetric agents. Each symmetric agent has a unique Agent ID assigned at reset (e.g., agents 0, 1, 2, 3) and arbitration will occur in circular order. After reset, agent 0 has the highest priority followed by agents 1, 2, and 3. Each symmetric agent maintains a common Rotating ID that reflects the symmetric Agent ID of the most recent bus owner. On every arbitration event, the symmetric agent with the highest priority becomes the owner and may enter into the request phase if there is no other action of higher priority preventing use of the bus. The priority agent(s) has higher priority that the symmetric owner.

A symmetric agent requests the bus by asserting its BREQn# signal. Based on the value sampled on BREQ[3:0] and the last symmetric bus owner, all agents can simultaneously determine the next symmetric bus owner. A priority agent asks for the bus by asserting BPRI#, which temporarily overrides the arbitration scheme because no other symmetric agent will issue another unlocked bus transaction until BPRI# is sampled inactive. The priority agent is always the next bus owner. The BNR# signal can be asserted by any bus agent to block further transactions from being issued to the bus (usually used when system resources such as buffers are filled and cannot accommodate another transaction). The assertion of the LOCK# signal indicates that the bus agent is executing an atomic sequence of bus transactions that should not be interrupted.

The priority agent can deassert BPRI# and release bus ownership in the same cycle that it generates its last request. In some Pentium® processors, after the BPRI# signal is asserted, the BPRI# signal remains deasserted for a minimum of two bus clock cycles. This matched the old 3 bus clock cycle rate (in some Pentium® processors), and so provided symmetric agents and priority agents balanced access to the bus. According to an embodiment, the protocol was changed to allow the BPRI# signal to be deasserted one bus clock cycle after being asserted. This change in a current embodiment supports a two bus clock cycle beat rate, one bus clock cycle for assertion and one cycle for deassertion.

As noted, the BNR# signal can be used to delay further requests, for example, when an agent does not have sufficient resources to support another transaction. According to an embodiment, a request stall protocol is implemented and is determined based on three states. A request stall state machine 375 to track and transition between these states is shown in the bus agent 345 of FIG. 3b.

1) Free: In this state, an agent's ability to issue requests is not limited by the BNR# request stall protocol, but is limited only by its ownership of the bus and by the request rate. In some Pentium® processors, the BNR# sampling point in the free state occurs three clock cycles after ADS# is sampled asserted. According to an embodiment, the BNR# sampling point was adjusted to occur two clock cycles (rather than three) after the ADS# signal is sampled asserted. When an agent intends to stop a new request generation in the free state, the agent drives BNR# active in the clock cycle before a valid BNR# sampling point from ADS#. In the next clock cycle, all agents observe an active BNR# on a BNR# sampling point and transition to the stalled state.

2) Throttled: An agent may issue one request in this state once it has ownership of the bus and the maximum ADS# request rate has been maintained. The BNR# sample point is in the first clock cycle of the throttled state. When in the throttled state, if BNR# is sampled active on a BNR# sampling point, the state transitions to the stalled state. If BNR# is sampled inactive on a BNR# sampling point, the state transitions to the free state.

3) Stalled: In this state, an agent may not issue a request until the BNR# signal sampled at the BNR# sampling point is inactive. The BNR# sampling point begins in the bus clock cycle when the stalled state is entered and every other subsequent clock cycle as long as BNR# is sampled active at its sampling point. A request stall state is initialized to stalled after a reset event (either INIT# or RESET#). An agent can extend the stalled state by asserting BNR# every two clock cycles (before the valid sampling points). If BNR# is not sampled active while in the stalled state, the request stall state will transition to the throttle state.

BNR# sampling occurs under the following conditions for one embodiment:
 1. Two clocks after RESET# has been sampled deasserted from a previously asserted condition; OR
 2. Four clocks after BINIT# was sampled asserted; OR
 3. Two clocks after ADS# is sampled asserted and the Request Stall state is "free"; OR
 4. Two clocks after the previous BNR# sample point if the Request Stall state is currently "throttled" or "stalled".

In one embodiment, BNR# is to be driven on the clock edge before the BNR# sample clock edge and desserted on the BNR# sample clock edge. Bus agents are to ignore BNR# in the clock after observation (BNR is sampled and observed on a once per every other clock basis). BNR# is to be inactive other than the valid sampling window.

Figure 8:
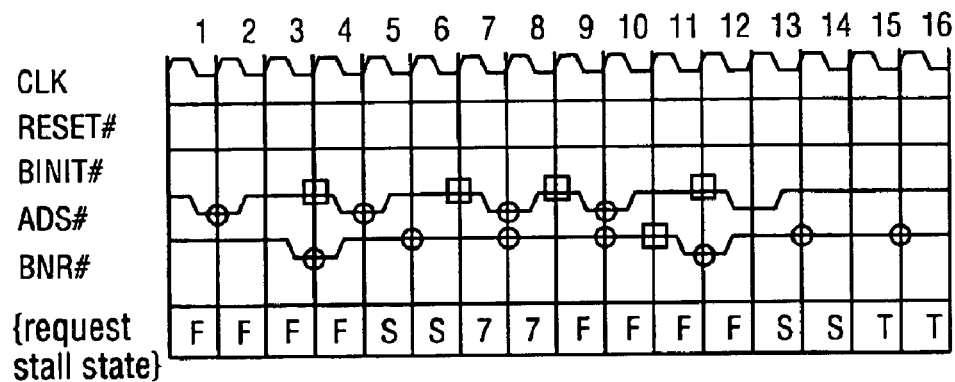
FIG. 8 is a timing diagram illustrating BNR# sampling after ADS# for one embodiment.

FIG. 8 is a timing diagram illustrating BNR# sampling after ADS# for one embodiment. A request is initiated in time slot T1 (numbers above waveforms indicate time slots and each time slot is a bus clock cycle in duration). In T3, an agent on the bus asserts BNR#, two clocks after ADS# activation, to begin request throttling. In T4 a new request is issued. This request is valid because the request stall state machine is in the free state and BNR# was not observed active during T3.

In T4, BNR# is sampled asserted, so the stalled state is entered in T5. A new transaction cannot be issued while the request stall state machine is in the stalled state. BNR# is observed in T6. If BNR# was observed active, then the request stall state machine would remain in the stalled state for another two clocks. In the example of FIG. 8, BNR# is observed deasserted in T6. In T7, the state machine transitions to the throttled state.

If an agent can allow one and only one transaction at a time, that agent can drive BNR# active when the request stall state machine enters the throttled state. Upon sampling BNR# active in the throttled state, the request stall state machine will transition back to the stalled state.

In T6, the current bus owner observes the request stalled state machine in the stalled state for the second consecutive clock and BNR# is observed inactive. This agent drives a new request in T7. In T7, the request stall state machine transitions to the Throttled state because BNR# was not observed active in T6. In T8, BNR# is observed inactive and the request stall state machine transitions to the Free state.

In T11 BNR# is asserted (two clocks after ADS#). In T12, a new ADS# is asserted. The new ADS# is valid because it met the two clock ADS# activation rule, and, in T11, the request stall state machine was in the Free state. In T12, BNR# is observed active. The request stall state machine transitions to the Stalled state in T13. BNR# is observed inactive in T14, which causes the request stall state machine to transition to the Throttled state in T15. Since BNR# was not asserted active in T15, the request stall state machine will transition to the Free state in T17 (not shown).

Thus, the arbitration phase protocol may be adjusted to match the bus beat frequency in one embodiment. Requiring the BPRI# signal to be deasserted only for a minimum of one bus clock cycle (rather than two) after being asserted, and adjusting the BNR# sampling point in the free state to occur two clock cycles (rather than three) after the ADS# signal is sampled asserted decreases the minimum latency between the beginning of successive arbitration phases from three bus clock cycles to two bus clock cycles.

2. Request Phase

The request phase is the phase in which the transaction is actually issued or driven to the bus. According to an embodiment the request phase is one common bus clock cycle in duration. The request phase includes two sub-phases, including sub-phase a (during the first half of the request phase) and sub-phase b (during the second sub-phase of the request phase). Request information is transmitted during the request phase, including the transaction address. The request phase begins with the assertion of the ADS# signal, the address strobe signal. An example group of signals that can be used to transmit a request is shown in the table below.

EXAMPLE REQUEST SIGNALS

| Pin Name | Pin Mnemonic | Signal Name | Signal Mnemonic | Number |
|---|---|---|---|---|
| Address Strobe | ADS# | Address Strobe | ADS# | 1 |
| Request Command | REQ[4:0]# | Request Extended Request | REQa[4:0]# REQb[4:0]# | 5 |
| Request Strobes | ADSTB[1:0]# | Request Strobes | ADSTB[1:0]# | 2 |
| Address Parity | AP[1:0]# | Address Parity | AP[1:0]# | 2 |
| Address | A[35:3]# | Address Reserved Attributes | Aa[35:3]# Ab[35:32]# ATTR[7:0]# or Ab[31:24]# | 33 |
| | | Deferred ID | DID[7:0]# or Ab[23:16]# | |
| | | Byte Enables | BE[7:0]# or Ab[15:8]# | |
| | | Extended Functions | EXF[4:0]# or Ab[1:0]# | | a. These signals are driven on the indicated pin during the first sub-phase (sub-phase a) of the Request phase.
b. These signals are driven during the second sub-phase (sub-phase b) of the Request phase.

Request phase.

Notably, the term "pin" is meant to be synonymous with the term "interface" in that any type of interface between an internal signal can and typically is referred to as a pin. Some examples include pins, balls, or other connectors used in integrated circuit or module connection. The term "pin" thus encompasses any known or otherwise available type of interface from one electronic component to another or to a connector such as a circuit board, module, or cable.

Thus, the transaction address is transmitted on Aa[35:3], and additional information (e.g., byte enables, attributes, extended functions) describing the transaction is transmitted on Ab[35:3] (Aa and Ab are transmitted on the same address lines during two sub-phases). The assertion of ADS# defines the beginning of the request phase. In one embodiment ADSTB[1:0]# toggles once in every bus clock cycle that ADS# is asserted, and not in any other cycles. The REQa[4:0]# and REQb[4:0]# signals identify the transaction type.

According to an embodiment, the request can be driven onto the processor bus in a bus cycle:
 1) the clock cycle after ownership observation; and
 2) two or more clocks after ADS# assertion for the previous transaction; and
 3) if BNR# is observed inactive; and
 4) if LOCK#, if not activated by this agent, is observed inactive Some Pentium® processors required a minimum delay of three clock cycles after assertion of ADS# of the previous transaction before the request could be driven onto the processor bus. To decrease the minimum latency between request phases of successive transactions from three clock cycles to two clock cycles, an agent may drive the request onto the bus after only two bus clock cycles after assertion of the ADS# signal of the previous transaction, according to an embodiment. As noted above, the ADS# signal identifies the beginning of the request phase, and indicates that sub-phase a of the request is being driven onto the processor bus including an address (provided over the address bus) and the request (provided over the REQ#[4:0] lines).

Figure 9:
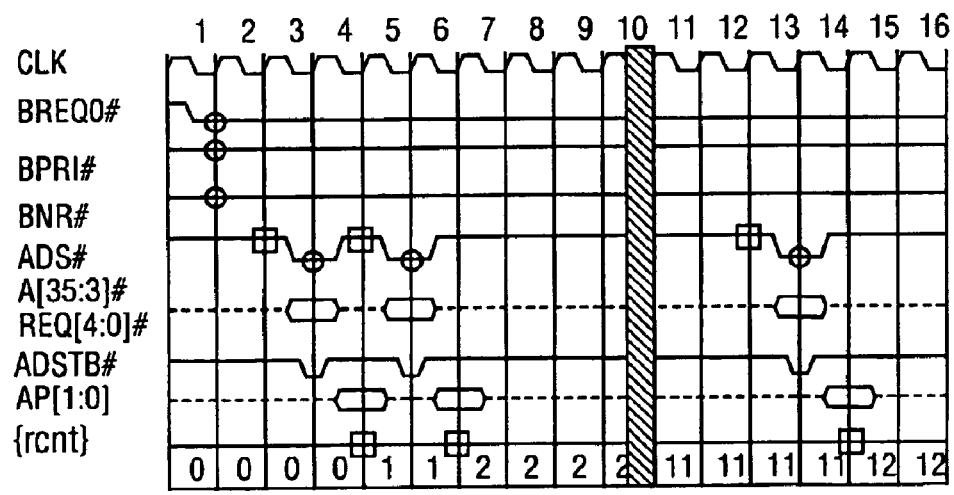
FIG. 9 is a timing diagram illustrating the request phase of several transactions according to one embodiment.

FIG. 9 is a timing diagram illustrating the request phase of several transactions for one embodiment. In T1, only one bus agent (agent 0) arbitrates for the bus. In T2, BREQ[3:0] #, BRPI# and BNR# are sampled and it is determined that agent 0 (asserting BREQ0#) becomes the bus owner in T3. In T3, agent 0 drives the first transaction by asserting ADS#. Also, in the first half of T3, A[35:3]#, REQa[4:0]# are driven valid. In the second half of T3 (the second sub-phase of the Request phase), the rest of the transaction information is driven out on the signals A[35:3] (ATTR[7:0]#, DID[7:0]#, BE[7:0]#, and EXF[4:0]#) and REQb[4:0]#. In T4, agent 0 drives the address parity AP[1:0]# valid.

When a transaction is driven to the bus, the internal state is updated in the clock after ADS# is observed asserted. Therefore, in T5, the internal request count (rcnt) is incremented by one. Also, in T5, agent 0 issues another transaction, which is consistent with the maximum request rate. In T7, the internal state is updated appropriately. In T13, the 12th transaction is issued as indicated on the bus by ADS# assertion. In T15, the internal request count is incremented to 12, which in this example, is the highest possible value for the internal request count (there are 12 entries in the IOQ in this example). Thus, no additional transactions can be issued until a response is given for the first transaction.

3. Snoop Phase According to an embodiment, the processor bus supports cache coherency for multiple caching agents. Coherency (or data consistency) ensures that a system or computer with multiple levels of cache and memory and multiple caching agents generally does not provide stale (or incorrect) data. A line is the unit of caching in the caching agents. According to an embodiment, a cache line is 64 bytes, but other size cache lines can be used. Various coherency techniques are known in the art. No attempt to completely define coherency is made here as a variety of known or otherwise available coherency techniques may be used and signaled according to the disclosed techniques.

A cache protocol associates states with lines and defines rules governing state transitions. Each line has a state in each cache. According to an embodiment, there are four line states, including: M (Modified) which indicates that the line is in this cache and contains a more recent value of the line than in memory, and the line is invalid in all other agents; E (Exclusive) indicating that the line is in this cache and is the same value as in memory and is invalid in all other agents; S (Shared) indicating that the line is in this cache, contains the same value as in memory and may be in other agents; and I (Invalid) indicating that the line is not available in this cache and should be fetched from another cache or agent.

The snoop phase is the phase in which cache coherency is enforced. The following is an example list of snoop signals which can be used during a snoop phase:

| EXAMPLE SNOOP SIGNALS | | |
|---|---|---|
| Signal Function | Pin Name | Driver |
| Keeping a Non-Modified Cache Line | HIT# | Agent with shared line |
| Hit to Modified Cache Line | HITM# | Agent with dirty line |
| Defer Transaction Completion | DEFER# | Responding Agent |

In the snoop phase, all caching agents drive their snoop results and participate in cache coherency resolution. The agents generate internal snoop results for nearly all memory transactions. All caching agents (snoop agents) drive their snoop results onto the bus in this phase using the HIT# and HITM# signals. HIT# is asserted during the snoop phase to indicate that a copy of a cache line that contains the requested data resides in another agent's cache on this interface. HITM# is asserted during the snoop phase to indicate that a modified copy of the cache line that contains the requested data resides in another agent's cache on this interface. If HIT# and HITM# are simultaneously asserted by an agent during a snoop phase, then a snoop stall has occurred and the current snoop phase should be extended. DEFER# is asserted during the snoop phase to indicate that he current transaction is not guaranteed to be completed.

According to an embodiment, the snoop results can be driven three clock cycles after the ADS# signal is asserted (i.e., three bus clock cycles after the beginning of the request phase) and at least two clock cycles after the snoop phase of the previous transaction (i.e., at least two clock cycles after the snoop results were driven onto the bus for the previous transaction or zero or more clocks from the time the most recent snoop phase was observed completed).

Figure 10:
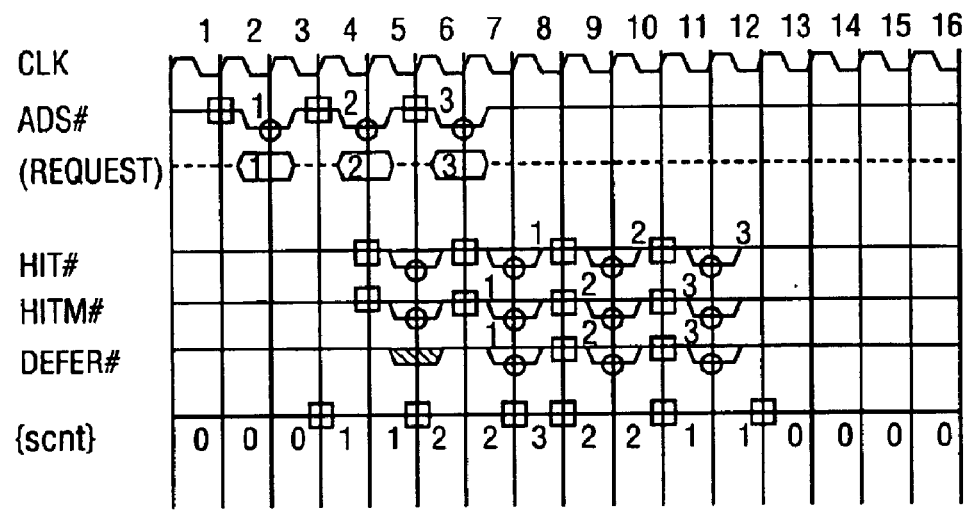
FIG. 10 is a timing diagram illustrating the snoop phase of several transactions according to one embodiment.

FIG. 10 illustrates snoop phases for several transactions according to one embodiment. In T1, there are no transactions outstanding on the bus and a snoop count (scnt) internally maintained by the bus agent is zero. The bus agent may maintain a snoop queue, as is known in the art, and a count of snoop requests in the queue may be kept in conjunction with the queue. In T2, transaction 1 is issued. In T4, as a result of the transaction driven in T2, scnt is incremented. In T4, transaction 2 is issued. In T5, which is three clocks after the corresponding ADS# in T2, the snoop results for transaction 1 are driven. In T6, scnt is incremented indicating that there are two transactions on the bus that have not completed the snoop phase.

In T6, the snoop results for transaction 1 are observed. Results are driven for transaction 2, therefore, zero clock cycles have elapsed between the observation of the results from transaction 1 and the assertion of the appropriate signals for transaction 2. In T7, scnt is decremented. In T6, the third transaction is issued. In T8, scnt is incremented as a result of the issuance of the third transaction. In T9, scnt is decremented because the snoop results form transaction 2 were observed in T8. In T10, the snoop results for transaction 3 are observed. In T11, scnt is again decremented.

Thus, the maximum activation rate for HIT#/HITM#/DEFER# signals (snoop result) was changed from once per every three bus clock cycles to once per every two bus clock cycles.

4. Response Phase

In the response phase, the response agent drives the transaction response onto the processor bus. Requests initiated in the request phase enter an in-order queue maintained by every bus agent. The responding agent is the agent responsible for completing the transaction at the top of the in-order queue. The responding agent is the device or agent addressed by the transaction during the request phase. Below is an example group of signals that can be used in the response phase:

| EXAMPLE RESPONSE SIGNALS | | |
|---|---|---|
| Type | Signal Names | Number |
| Response Status | RS[2:0]# | 3 |
| Response Parity | RSP# | 1 |
| Target Ready | TRDY# | 1 |

According to an embodiment, a response can be driven after a minimum of two bus clock cycles after the response of the previous transaction. This minimum latency is typically subject to other constraints which may extend this latency. Due to the double pumped signaling mode used for the request signals, a response can be driven once per every two bus clock cycles (as compared to once per every three bus clock cycles for some Pentium® processors).

Valid response encodings are determined based on snoop results and may be encoded in a variety of manners, including those previously used in prior Pentium® processors. The following table indicates possible responses for one embodiment.

| | |
|---|---|
| Hard Failure | is a valid response for all transactions and indicates transaction failure. The requesting agent is required to take recovery action. |
| Implicit Writeback | is the appropriate response when HITM# is asserted during the snoop phase. The snooping agent is to transfer the modified cache line. The memory agent is required to drive the response and accept the modified cache line. |
| Deferred Response | is only allowed when DEN# is asserted during the request phase and DEFER# (with HITM# inactive) is asserted during the snoop phase. With the deferred response, the response agent indicates that it intends to complete the transaction in the future using a deferred reply transaction. |
| Retry Response | is only allowed when DEFER# (with HITM# inactive) is asserted during the snoop phase. With the retry response, the response agent informs the request agent that the transaction is to be retried. |

| | |
|---|---|
| Normal Data Response | is required when the REQ[4:0]# encoding in the request phase requires a read data response and HITM# and DEFER# are both inactive during the snoop phase. With the normal data response, the response agent is required to transfer read data along with the response. |
| No Data Response | is required when no read data will be returned by the addressed agent and DEFER# and HITM# are inactive during the snoop phase, and for all non-memory central transactions, except interrupt acknowledge transactions. |

In one embodiment, the response phase protocol rules are as follows:

a. Request Initiated TRDY# Assertion

A request initiated transaction is a transaction where the request agent has write data to transfer. The addressed agent asserts TRDY# to indicate its ability to receive data from the request agent intending to perform a write data operation. Request initiated TRDY# for transaction N is asserted:

1. If TRDY# has been deasserted for at least one clock; AND
2. A minimum of two clocks after ADS# assertion for transaction N; AND
3. Transaction N is at the top of the IOQ, OR a minimum of one clock after RS[2:0]# active assertion for transaction N−1 (after the response for transaction N−1 is driven).

b. Snoop Initiated TRDY# Assertion

The response agent asserts TRDY# to indicate its ability to receive a modified cache line from a snooping agent. Snoop initiated TRDY# for transaction N is asserted:

1. A minimum of one clock after the snoop result phase for transaction N has been observed; AND
2. if transaction N is at the top of the IOQ, OR a minimum of one clock after RS[2:0]# for transaction N−1 is asserted on the bus; AND
3. in the case of a request initiated transfer, if the request initiated TRDY# active/DBSY# inactive event for transaction N has been observed and TRDY# has been deasserted for at least one clock.

c. Request Initiated TRDY# Deassertion Protocol

The agent asserting TRDY# for transaction N can deassert TRDY# as soon as it can ensure that TRDY# deassertion meets the following conditions:

1. Transaction N is at the top of the IOQ AND (active TRDY#/inactive DBSY# is observed OR DBSY# is observed inactive in the first clock that TRDY# was asserted, OR the agent asserting TRDY# for transaction N is asserting DBSY# for transaction N−1 and deasserts DBSY#; AND
2. A minimum of three clocks from a previous TRDY# deassertion; AND
3. On or before RS[2:0]# assertion for transaction N.

TRDY# for a request initiated transfer is to be deasserted to allow the TRDY# for an implicit writeback.

In some embodiments, these rules may allow back-to-back write transfers following a bus turn-around from reads to writes, thereby allowing a high maximum transfer rate to be achieved.

d. Snoop Initiated TRDY# Deassertion Protocol

The agent asserting a snoop initiated TRDY# can deassert TRDY# as soon as the bus agent can ensure that TRDY# deassertion meets the following conditions (in one embodiment, these conditions apply for all addressing modes):

1. Transaction N is at the top of the IOQ and active TRDY#/inactive DBSY# is observed for one clock OR transaction N is at the top of the IOQ and DBSY# is observed inactive in the first clock that TRY# is asserted; AND
2. A minimum of three clocks has passed from a previous TRDY# deassertion clock; AND
3. TRDY# is deasserted on or before RS[2:0]# assertion for transaction N.

e. RS[2:0]#, RSP# Protocol

The response signals are normally in idle state when not being driven active by any agent. The response agent asserts RS[2:0]# and RSP# for one clock to indicate the type of response used for transaction completion. In the next clock, the response agent drives the signals to the idle state. A response for transaction N is asserted:

1. If the snoop phase for transaction N is observed; and
2. A minimum of two clock cycles after the RS[2:0]# assertion of transaction N−1; and
3. If the transaction contains a write data transfer, the Request Initiated TRDY# deassertion Rules have been met; and
4. If the transaction contains an implicit writeback data transfer, RS[2:0]# for transaction N is driven one cycle after the Snoop Initiated TRDY# Deassertion Rules have been met and TRDY# has been observed; and
5. If the response to be driven onto RS[2:0]# response is "Normal Data Response", then DBSY# is observed inactive and the most recent TRDY# active/DBSY# inactive observation occurred three or more clocks prior to this clock; and
6. A response that does not require the data bus (no data response, deferred response, retry response, or hard failure response) may be driven regardless of the state of DBSY#.

Upon observation of active RS[2:0]# response, the transaction queues are updated and rent is decremented.

Other embodiments may implement only a subset of these rules as may be convenient or as may provide an acceptable performance level for the desired implementation.

Figure 11:
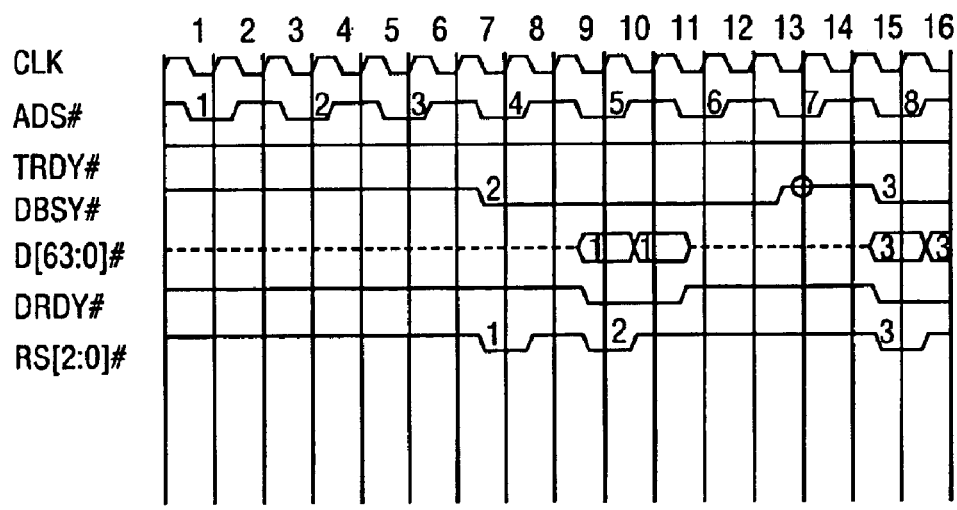
FIG. 11 illustrates a full speed write line transaction for one embodiment.

FIG. 11 illustrates a full speed write line transaction for one embodiment. Some prior art processors were unable to transfer as much data in a similar number of clock cycles. Write line transactions are driven in the embodiment of FIG. 11 at the full rate of once per three clocks. The first transaction occurs on an idle bus, and TRDY# is first asserted at T3. The normal no data response can be driven in T6 after inactive HITM# is observed in T5. TRDY# is observed active and DBSY# is observed inactive in T4. Therefore the data transfer for transaction 1 can begin in T5 as indicated by the DRDY# assertion.

TRDY# for transaction 2 is driven in T7, the cycle after RS[2:0]# is driven for transaction 1. In T7, DBSY# is observed inactive. Therefore, since all other conditions for request initiated TRDY# deassertion have been met, the RS[2:0]# activation for transaction 2 occurs in T8. TRDY# for transaction 3 and DBSY# for the data phase of transaction 2 are asserted in T9.

A special optimization may be made when the same agent drives both request-initiated data transfers. In T10, the request agent is deasserting DBSY# and is observing TRDY# asserted for transaction 3. Since this agent owns the data transfer for transaction 3, that agent can drive the data for transaction 3 in T11 without inserting a dead cycle between the data transfers for transactions 2 and 3.

To meet the three clock TRDY# deassertion condition for the TRDY# activation of transaction 3, the responding agent is to wait until T10 to sample the TRDY# deassertion conditions. Note, however, that in T10, the responding agent observes DBSY# active. The responding agent cannot activate RS[2:0]# until the data phase for transaction 3 can commence. Therefore, the responding agent will wait until it observes DBSY# inactive to assert RS[2:0]# for transaction 3. In T11, the responding agent observes DBSY# inactive and asserts RS[2:0]# for transaction 3 in T12. TRDY# for transaction 4 is asserted in T13.

The responding agent observes TRDY# active/DBSY# inactive in T14 and asserts RS[2:0]# for transaction 4 in T15. Note that TRDY# is to remain asserted until T15 to meet the three clock deassertion condition.

Figure 12:
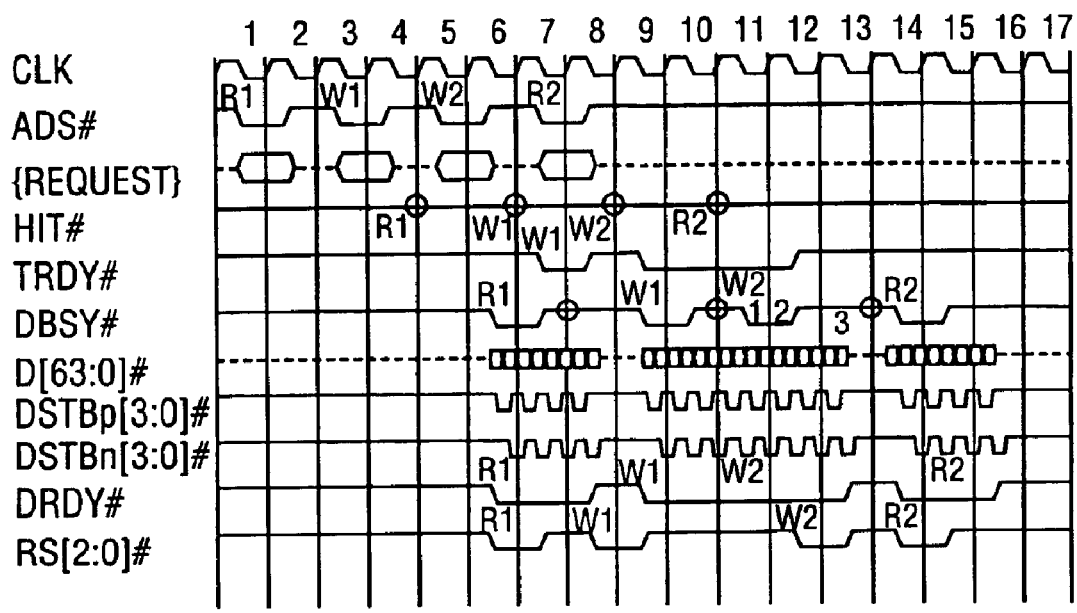
FIG. 12 illustrates a read-write-write-read line transaction for one embodiment.

FIG. 12 illustrates a read-write-write-read line transaction for one embodiment. Optimizations made to the TRDY# deassertion rules for one embodiment allow back-to-back writes to occur with no intervening dead cycle. This improves performance of operations such as evictions of two (contiguous) cache lines. In this case, the data transfer occurs in two clocks. For cases where the data transfers require greater than two clocks, normal TRDY#/RS[2:0]# suffices.

In FIG. 12, the first transaction occurs on an idle bus. The normal-w/data response can be driven in T6 after inactive HITM# is observed in T5. Therefore the data transfer of transaction R1 can being in T6 as indicated by the DRDY# assertion.

TRDY# for transaction W1 is driven the cycle after RS[2:0]# is driven for transaction R1. In T7, the agent that is asserting TRDY# is also the agent that asserted DBSY# in T6. Therefore, based on the optimized TRDY# deassertion rule, TRDY# for W1 is deasserted in T8 and, assuming all other conditions have been met, the RS[2:0]# activation for transaction W1 occurs in T8. The DBSY# assertion for the data phase of transaction W1 is asserted in T9. TRDY# assertion for transaction W2 occurs in T9.

An improvement is also obtained when the same agent drives both request-initiated data transfers. Since in T10, the request agent is deasserting DBSY#, has observed TRDY# asserted for transaction W2, and owns the data transfer for transaction W2, that agent can drive the data for transaction W2 in T11 without inserting a dead cycle between the data transfer between the data transactions for W1 and W2.

Note, however, that in T10, the responding agent observes TRDY# active/DBSY# active. The responding agent cannot activate RS[2:0]# until the request initiated TRDY# deassertion conditions have been met. In T11, the responding agent observes DBSY# inactive and asserts RS[2:0]# for transaction W2 in T12.

The responding agent asserts RS[2:0]# for transaction R2 in T14. Note that RS[2:0]# for R2 was delayed until T14 because of the new requirement for this embodiment that RS[2:0]# for a transaction with "Response-w/Data" is to occur no sooner than three clocks after the last TRDY# active/DBSY# inactive observation event. Nonetheless, the example of FIG. 12 illustrates an example of improved throughput enabled by presently disclosed protocol enhancements.

Figure 13:
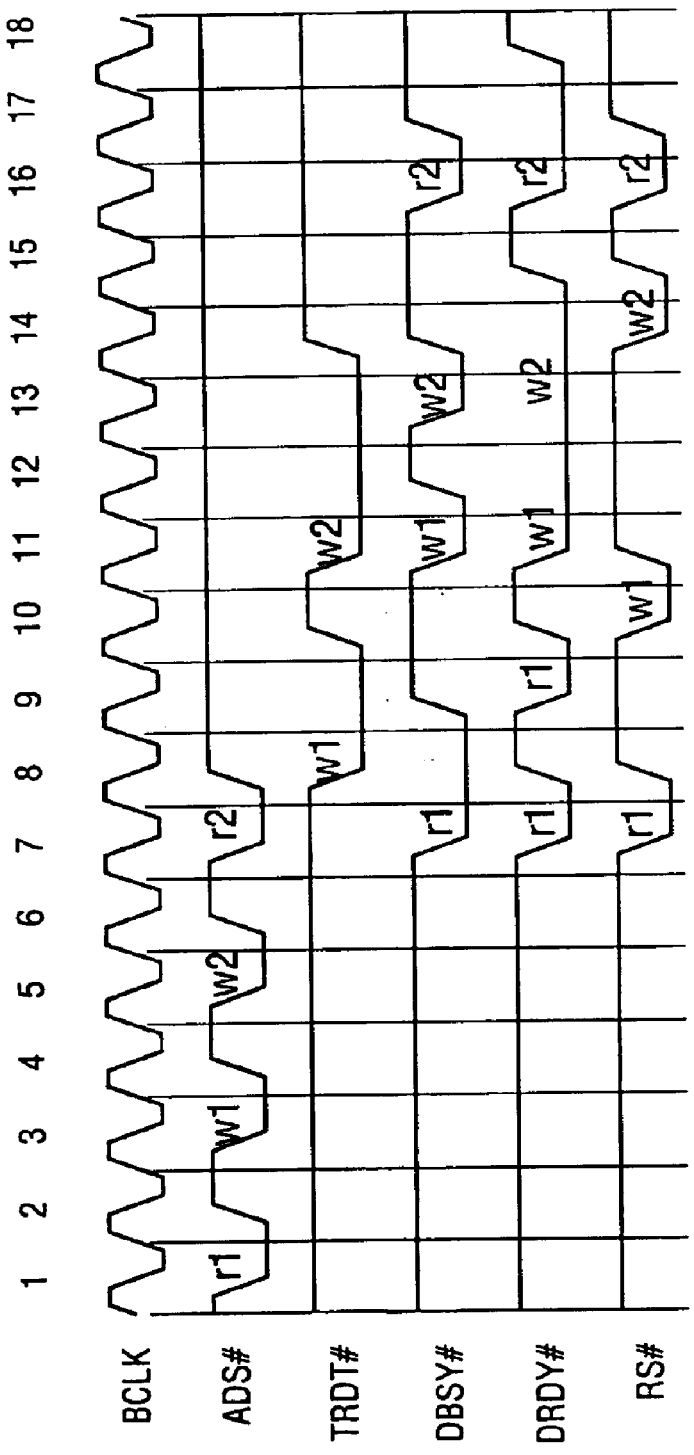
FIG. 13 illustrates a read-write-write-read transaction with a wait state for one embodiment.

FIG. 13 illustrates a read-write-write-read transaction similar to that of FIG. 12, except that a wait state is inserted.

In the embodiment shown in FIG. 13, an optimization is possible due to the fact that the request initiated TRDY# deassertion rule allows TRDY# to be deasserted if (in addition to the other conditions) the agent asserting TRDY for transaction N is asserting DBSY# for transaction N–1 and deasserts DBSY# (without regard to which clock TRDY# for transaction N is asserted). In this case, the TRDY# signal may be deasserted in the next cycle if DBSY# is asserted the previous cycle by the agent asserting TRDY#, and is known to be deasserted presently. Thus, TRDY# may be deasserted in cycle T10. This condition may occur if a chipset (or other agent) inserts a wait state into a burst read.

5. Data (Transfer) Phase

During the Data phase, data is transferred between different bus agents over the processor bus 117. Based on the request phase, a transaction either contains a "request-initiated" (write) data transfer, a "response-initiated" (read) data transfer, or no data transfer. The data phase may overlap with the request phase for a transaction.

Below is an example list of signals that can be used in the data phase:

| EXAMPLE DATA SIGNALS | | |
|---|---|---|
| Type | Signal Names | Number |
| Data Ready | DRDY# | 1 |
| Data Bus Busy | DBSY# | 1 |
| Data Strobes | DSTBp[3:0]#<br>DSTBp[3:0]# | 8 |
| Data | D[63:0]# | 64 |
| Data Inversion | DINV[3:0]# | 4 |
| Data parity | DP[3:0]# | 4 |

DRDY# indicates that valid data has been placed on the bus 117 to be latched. The data bus owner asserts DRDY# for each bus clock cycle in which valid data is to be transferred. DRDY# can be deasserted to insert wait states in the data phase. DBSY# can be used to hold the data bus before the first DRDY# assertion and between subsequent DRDY# assertions for a multiple bus clock data transfer. DRDY# and DBSY# are common clock (1x) protocol signals.

DINV[3:0]# are used to indicate that the data bits have been inverted by the data source. Data may be inverted by the data source in order to limit switching current. In one embodiment, the DINV signals assure that at most eight bits in a sixteen bit group are asserted (driven low) at a time. If more than eight bits would be asserted by the data presented to the data bus interface logic, the group of sixteen is inverted. Receivers in another bus agent receive the DINV signals along with the data and undo any inversions indicated by the DINV signals. The DINV signals are quad pumped to deliver inversion information for each data sub-phase.

The data signals D[63:0]# of the data bus 206 (FIG. 2) provide a 64-bit data path between bus agents. For a partial transfer, including I/O read and I/O write transactions, the byte enable signals (BE[7:0]#) determine which bytes of the data bus will contain the valid data. The DP signals can be used to provide parity for the data signals.

According to an embodiment, data may be transferred using a quad pumped (i.e., 4x) source synchronous latched protocol in which the data signals D[63:0]# are used to transmit four 8-byte data elements in a time period equivalent to a single bus clock cycle as discussed in detail above.

The first 8-bytes (in burst order) are transmitted in the first quarter of the time period, the second 8-byte element in the second quarter, the third 8-byte element in the third quarter and the fourth 8-byte element in the fourth quarter. The data can be generated in the first quarter of the time period if the data to be transferred is 1 to 8 bytes in length, and the data can be generated in the first two quarters of the time period if thee data is 9–16 bytes in length.

In one embodiment, data bursts start with the chunk specified by the transaction's address. The remaining chunks in the burst are transferred in the order in the tables below.

| Burst Order for 16 Byte Transfers | | | |
|---|---|---|---|
| A[3]# (binary) | Address (hex) | 1st (hex) | 2nd (hex) |
| 0 | 0 | 0 | 8 |
| 1 | 8 | 8 | 0 |

| Burst Order for 32 Byte Transfers | | | | | |
|---|---|---|---|---|---|
| A[4:3]# (binary) | Address (hex) | 1st (hex) | 2nd (hex) | 3rd (hex) | 4th (hex) |
| 00 | 0 | 0 | 8 | 10 | 18 |
| 01 | 8 | 8 | 0 | 18 | 10 |
| 10 | 10 | 10 | 18 | 0 | 8 |
| 11 | 18 | 18 | 10 | 8 | 0 |

| Burst Order for 64 Byte (Line) Transfers | | | | | | | | | |
|---|---|---|---|---|---|---|---|---|---|
| A[5:3]# (binary) | Address (hex) | 1st (hex) | 2nd (hex) | 3rd (hex) | 4th (hex) | 5th (hex) | 6th (hex) | 7th (hex) | 8th (hex) |
| 000 | 0 | 0 | 8 | 10 | 18 | 20 | 28 | 30 | 38 |
| 001 | 8 | 8 | 0 | 18 | 10 | 28 | 20 | 38 | 30 |
| 010 | 10 | 10 | 18 | 0 | 8 | 30 | 38 | 20 | 28 |
| 011 | 18 | 18 | 10 | 8 | 0 | 38 | 30 | 28 | 20 |
| 100 | 20 | 20 | 28 | 30 | 38 | 0 | 8 | 10 | 18 |
| 101 | 28 | 28 | 20 | 38 | 30 | 8 | 0 | 18 | 10 |
| 110 | 30 | 30 | 38 | 20 | 28 | 10 | 18 | 0 | 8 |
| 111 | 38 | 38 | 30 | 28 | 20 | 18 | 10 | 8 | 0 |

VIII. The Design (Stored, Encoded, Modulated, etc.) as an Article

Figure 14:
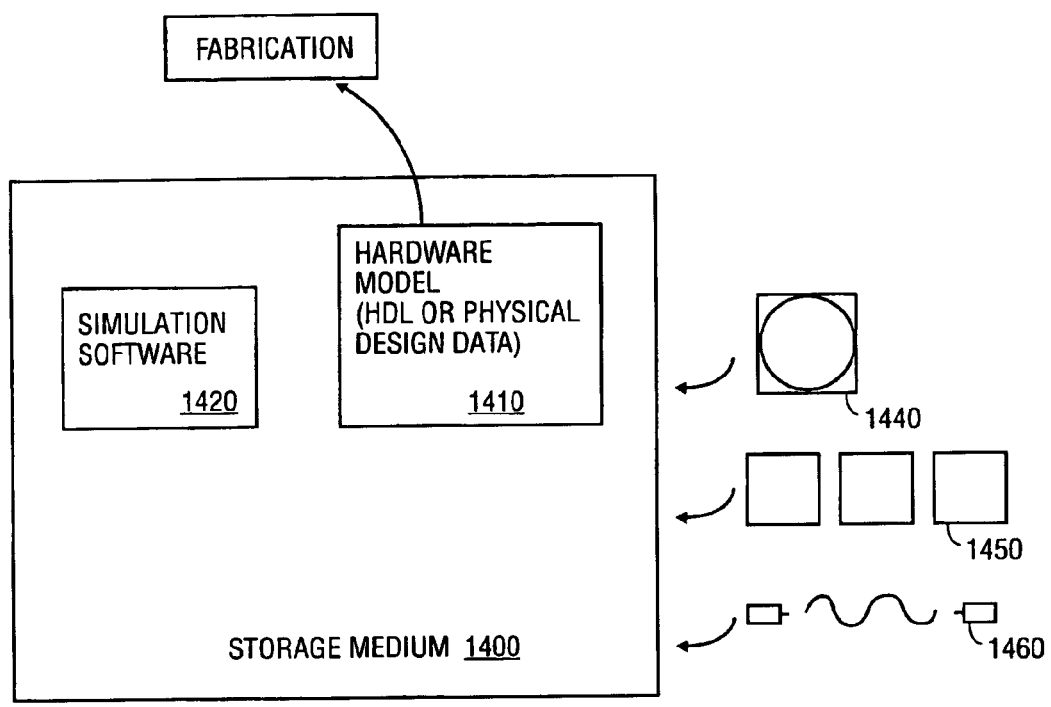
FIG. 14 illustrates various design representations or formats for simulation, emulation, and fabrication of a design using the disclosed techniques.

FIG. 14 illustrates various design representations or formats for simulation, emulation, and fabrication of a design using the disclosed techniques. Data representing a design may represent the design in a number of manners. First, as is useful in simulations, the hardware may be represented using a hardware description language or another functional description language which essentially provides a computerized model of how the designed hardware is expected to perform. The hardware model 1410 may be stored in a storage medium 1400 such as a computer memory so that the model may be simulated using simulation software 1420 that applies a particular test suite 1430 to the hardware model 1410 to determine if it indeed functions as intended. In some embodiments, the simulation software is not recorded, captured, or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, re-configurable hardware is another embodiment that may involve a machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a machine readable medium. An optical or electrical wave 1460 modulated or otherwise generated to transmit such information, a memory 1450, or a magnetic or optical storage 1440 such as a disc may be the machine readable medium. Any of these mediums may "carry" the design information. The term "carry" (e.g., a machine readable medium carrying information) thus covers information stored on a storage device or information encoded or modulated into or on to a carrier wave. The set of bits describing the design or the particular part of the design are (when embodied in a machine readable medium such as a carrier or storage medium) an article that may be sold in and of itself or used by others for further design or fabrication.

Thus, an enhanced pipelined bus architecture and protocol is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A bus agent comprising:
   a control interface to drive a control signal at a clock frequency;
   an address bus interface to drive address elements at twice the clock frequency, said address bus interface to drive a substantially centered address strobe transition for each address element;
   a data bus interface to drive data elements at four times the clock frequency, said data bus interface to drive a substantially centered data strobe transition for each data element.

2. The bus agent of claim 1 wherein said data bus interface is to generate first, second, third, and fourth data elements in a first signal generation time period and wherein said address bus interface is to generate first and second address elements in a second signal generation time period, said first signal generation time period and said second signal generation time period each being substantially equivalent to a clock cycle of a clock signal that operates at the clock frequency, wherein:
- a first edge of a first data strobe is to be positioned at approximately a 12.5 percent point of the first signal generation time period;
- a first edge of a second data strobe is to be positioned at approximately a 37.5 percent point of said first signal generation time period;
- a second edge of said first data strobe is to be positioned at approximately a 67.5 percent point of the first signal generation time period;
- a second edge of said second data strobe is to be positioned at approximately a 87.5 percent point of the first signal generation time period;
- said first data element to be generated at approximately a beginning of the first signal generation time period;
- said second data element is to be transmitted at approximately a twenty five percent point of the first signal generation time period;
- said third data element is to be transmitted at approximately a fifty percent point of the first signal generation time period;
- said fourth data element is to be transmitted at approximately a seventy five percent point of the first signal generation time period;
- a first edge of a first address strobe is to be positioned at approximately a twenty five percent of said second signal generation time period,
- a second edge of said first address strobe is to be positioned at approximately a seventy five percent of said second signal generation time period;
- said first address elements is to be transmitted at approximately a beginning of the second signal generation time period;
- said second address elements is to be transmitted at approximately a fifty percent point of the second signal generation time period.

3. The bus agent of claim 1 further comprising:
- address strobe generation logic to generate a first address strobe to have a first address strobe transition at substantially a first address element center point of a first address element driving window in which a first address element is to be driven, and wherein
- said address strobe generation logic is to generate said first address strobe to have a second transition at substantially a second address element center point of a second address element driving window in which a second address element is to be driven;
- data strobe generation logic to generate a first data strobe to have a first transition of the first data strobe at substantially a first data element center point of a first data element driving window in which a first data element is to be driven, and wherein
- said data strobe generation logic is to generate a second data strobe to have a first transition of the second data strobe at substantially a second data element center point of a second data element driving window in which a second data element is to be driven, and wherein
- said data strobe generation logic is to generate a second transition of the first data strobe to have a second transition of the first data strobe at substantially a third data element center point of a third data element driving window in which a third data element is to be driven, and wherein
- said data strobe generation logic is to generate a second transition of the second data strobe to have a second transition of the second data strobe at substantially a fourth data element center point of a fourth data element driving window in which a fourth data element is to be driven.

4. The bus agent of claim 3 wherein said first data strobe and said second data strobe are signals having out-of-phase waveforms that have a data strobe operating frequency when enabled of twice the clock frequency.

5. The bus agent of claim 3 wherein the first transition of the first data strobe and the second transition of the first data strobe are of a first polarity and said first data strobe has a transition of opposite polarity after the first transition of the first data strobe and before the second transition of the first data strobe.

6. The bus agent of claim 1 wherein the clock signal is a bus clock signal and wherein:
- said address bus interface is to transmit address elements at a rising edge of the bus clock signal in a first bus clock cycle of the bus clock signal and additional address elements at a 50 percent point of the first bus clock cycle, and wherein
- said address bus interface is to generate said first address strobe to have a first address strobe transition at a 25 percent point of the first bus clock cycle and a second address strobe transition at a 75 percent point of the first bus clock cycle, and wherein
- said data bus interface is to transmit first data elements at a second rising edge of the bus clock signal in a second bus clock cycle of the bus clock signal, second data elements at a 25 percent point of the second bus clock cycle, third data elements at a 50 percent point of the second bus clock cycle, and fourth data elements at a 75 percent point of the second bus clock cycle, and wherein
- said data bus interface is to generate said first data strobe and said second data strobe to have first data strobe transitions at a 12.5 percent point of the second bus clock cycle, second data strobe transitions at a 37.5 percent point of the second bus clock cycle, third data strobe transitions at a 67.5 percent point of the second bus clock cycle, and fourth data strobe transitions at a 87.5 percent point of the second bus clock cycle.

7. The bus agent of claim 1 wherein said address bus interface is to drive a first address strobe at the clock frequency, said first address strobe having a first address strobe transition of a first polarity to be substantially centered on a first address element and a second address strobe transition of a second polarity to be substantially centered on a second address element, the second address element being consecutive to the first address element, and wherein said data bus interface is to drive four consecutive data elements and a first data strobe and a second data strobe, and wherein a first edge of a first type of the first data strobe is to be substantially centered on a first data element, a first edge of the first polarity of the second data strobe is to be substantially centered on the second data element, a second edge of the first type of the first data strobe is to be substantially centered on the third data element, and a second edge of the first type of the second data strobe is to be substantially centered on the fourth data element.

8. The bus agent of claim 1, wherein said bus agent is to support a transaction having a plurality of phases, said plurality of phases comprising an arbitration phase, a request phase, a snoop phase, a response phase, and a data phase.

9. The bus agent of claim 1 or 2 or 3, wherein said bus agent is to support a plurality of transactions having a plurality of phases, said plurality of phases comprising an arbitration phase, a request phase, a snoop phase, a response phase, and a data phase, wherein some of said plurality of phases are optional for some transactions.

10. The bus agent of claim 9 wherein
said bus agent is capable of initiating the arbitration phase after two clocks from a prior arbitration phase and capable of receiving a block next request signal two bus clock cycles after assertion of an address strobe signal occurs and capable of responding to said block next request signal.

11. The bus agent of claim 9 wherein:
said bus agent is capable of initiating a second request phase for a second transaction in a current clock cycle two clocks after a first request phase for a first transaction by asserting a plurality of request signals and a second transaction address strobe signal for the second transaction two bus cycles after assertion of a first transaction address strobe signal for the first transaction occurs if a most recent target ready signal active and data bus busy inactive observation occurred three or more clocks prior to the current clock cycle.

12. The bus agent of claim 11 wherein:
said bus agent is capable of sensing or asserting one or more of a plurality of snoop status signals for transaction N on a plurality of snoop status interfaces during a snoop phase occurring upon a later one of:
three or more bus clock cycles of a bus clock signal after the assertion of an address strobe signal for transaction N; or
a most recent snoop phase for another transaction has been observed completed for zero or more clocks.

13. The bus agent of claim 12 wherein:
said bus agent is to track a plurality of a phases of a plurality of bus transactions on a bus which is a multi-phase pipelined bus, and said bus agent is to track a transaction N−1 and a transaction N, wherein said bus controller is capable of asserting a response for transaction N two or more bus clock cycles after asserting a response for transaction N−1.

14. The bus agent of claim 12 wherein:
said bus agent is to track a plurality of transactions comprising a transaction N−1 and a transaction N, the bus agent being capable of asserting the target ready signal for transaction N if the bus agent is asserting the data busy signal for the transaction N−1 and deasserts the data busy signal.

15. The bus agent of claim 1 wherein said address bus interface is to drive an address strobe signal having a first transition of a first type as the substantially centered address strobe transition for a first address element and is to drive a second transition of a second type as the substantially centered address strobe transition for a second address element, said first address element and said second address element being driven in a first duration substantially equivalent to a cycle of a clock signal at the clock frequency.

16. The bus agent of claim 15 wherein said data bus interface is to drive a first data strobe and a second data strobe at twice the clock frequency.

17. The bus agent of claim 16 wherein a first data strobe transition of a first data strobe transition type of the first data strobe is to be generated substantially centered to a first data element, and wherein a first data strobe transition of the first data strobe transition type of the second data strobe is to be generated substantially centered to a second data element, and wherein a second data strobe transition of the first data strobe transition type of the first data strobe is to be generated substantially centered to a third data element, and wherein a second data strobe transition of the first data strobe transition type of the second data strobe is to be generated substantially centered to a fourth data element, said first through fourth data elements being transmitted sequentially in order of the first through the fourth, said first through fourth data elements being generated in a second duration substantially equivalent to the clock cycle of the clock signal at the clock frequency.

18. The bus agent of claim 17 wherein the first type of transition is a falling edge of a data strobe.

19. A bus agent comprising:
a plurality of data pins;
a plurality of data strobe pins;
a plurality of address pins;
an address strobe pin;
a common clock pin for a bus clock signal having a bus clock frequency;
data strobe generation logic to generate a first data strobe and a second data strobe on a first data strobe pin and a second data strobe pin, said first data strobe and said second data strobe having a data strobe frequency of twice said bus clock frequency;
address strobe generation logic to generate a first address strobe on said address strobe pin having an address strobe frequency which is the same as said bus clock frequency;
data transmit logic to transmit first data elements synchronized to a first edge of said first data strobe on said plurality of data pins and to transmit second data elements synchronized to a first edge of said second data strobe also on said plurality of data pins and to transmit third data elements synchronized to a second edge of said first data strobe on said plurality of data pins and to transmit fourth data elements synchronized to a second edge of said second data strobe also on said plurality of data pins;
address transmit logic to transmit first address elements synchronized to a first edge of said first address strobe on said plurality of address pins and to transmit second address elements synchronized to a second edge of said first address strobe also on said plurality of address pins.

20. The bus agent of claim 19 wherein said first through fourth data elements are generated in a first signal generation time period and wherein said first and second address elements are generated in a second signal generation time period, said first signal generation time period and said second signal generation time period each being substantially equivalent to a clock cycle of the bus clock signal, wherein:
said first edge of said first data strobe is to be positioned at approximately a 12.5 percent point of the first signal generation time period;
said first edge of said second data strobe is to be positioned at approximately a 37.5 percent point of said first signal generation time period;

said second edge of said first data strobe is to be positioned at approximately a 67.5 percent point of the first signal generation time period;

said second edge of said second data strobe is to be positioned at approximately a 87.5 percent point of the first signal generation time period;

said first data elements to be generated at approximately a beginning of the first signal generation time period;

said second data elements is to be transmitted at approximately a twenty five percent point of the first signal generation time period;

said third data elements is to be transmitted at approximately a fifty percent point of the first signal generation time period;

said fourth data elements is to be transmitted at approximately a seventy five percent point of the first signal generation time period;

said first edge of said first address strobe is to be positioned at approximately a twenty five percent of said second signal generation time period, said second edge of said first address strobe is to be positioned at approximately a seventy five percent of said second signal generation time period;

said first address elements is to be transmitted at approximately a beginning of the second signal generation time period;

said second address elements is to be transmitted at approximately a fifty percent point of the second signal generation time period.

21. The bus agent of claim 19 wherein
said address strobe generation logic is to generate said first address strobe to have a first address strobe transition at substantially a first address element center point of a first address element driving window in which the first address elements are driven, and wherein said address strobe generation logic is to generate said first address strobe to have a second transition at substantially a second address element center point of a second address element driving window in which the second address elements are driven, and wherein said data strobe generation logic is to generate said first transition of the first data strobe to have a first transition of the first data strobe at substantially a first data element center point of a first data element driving window in which the first data elements are driven, and wherein said data strobe generation logic is to generate said first transition of the second data strobe to have a first transition of the second data strobe at substantially a second data element center point of a second data element driving window in which the second data elements are driven, and wherein said data strobe generation logic is to generate said second transition of the first data strobe to have a second transition of the first data strobe at substantially a third data element center point of a third data element driving window in which the third data elements are driven, and wherein said data strobe generation logic is to generate said second transition of the second data strobe to have a second transition of the second data strobe at substantially a fourth data element center point of a fourth data element driving window in which the fourth data elements are driven.

22. The bus agent of claim 21 wherein said first data strobe and said second data strobe are signals having out-of-phase waveforms that have an operating frequency when enabled of twice the bus clock frequency.

23. The bus agent of claim 21 wherein the first transition of the first data strobe and the second transition of the first data strobe are of a first polarity and said first data strobe has a transition of opposite polarity after the first transition of the first data strobe and before the second transition of the first data strobe.

24. The bus agent of claim 19 wherein:
said address transmit logic is to transmit address elements at a rising edge of the bus clock signal in a first bus clock cycle of the bus clock signal and additional address elements at a 50 percent point of the first bus clock cycle, and wherein said address strobe generation logic is to generate said first address strobe to have a first address strobe transition at a 25 percent point of the first bus clock cycle and a second address strobe transition at a 75 percent point of the first bus clock cycle, and wherein said data transmit logic is to transmit first data elements at a second rising edge of the bus clock signal in a second bus clock cycle of the bus clock signal, second data elements at a 25 percent point of the second bus clock cycle, third data elements at a 50 percent point of the second bus clock cycle, and fourth data elements at a 75 percent point of the second bus clock cycle, and wherein said data strobe generation logic is to generate said first data strobe and said second data strobe to have first data strobe transitions at a 12.5 percent point of the second bus clock cycle, second data strobe transitions at a 37.5 percent point of the second bus clock cycle, third data strobe transitions at a 67.5 percent point of the second bus clock cycle, and fourth data strobe transitions at a 87.5 percent point of the second bus clock cycle.

25. The bus agent of claim 24 wherein said first data strobe and said second data strobe have offset in time waveforms, and wherein said data strobe generation logic is to generate multiple pairs of data strobes, each pair having one strobe having a waveform substantially identical to each of said first data strobe and said second data strobe.

26. The bus agent of claim 19, wherein said bus agent is to support a transaction having a plurality of phases, said plurality of phases comprising an arbitration phase, a request phase, a snoop phase, a response phase, and a data phase.

27. The bus agent of claim 19, wherein said bus agent is to support a plurality of transactions having a plurality of phases, said plurality of phases comprising an arbitration phase, a request phase, a snoop phase, a response phase, and a data phase, wherein some of said plurality of phases are optional for some transactions.

28. The bus agent of claim 27 wherein
said bus agent is capable of initiating an arbitration phase after two clocks from a prior arbitration phase and capable of receiving a block next request signal two bus clock cycles after assertion of an address strobe signal occurs and capable of responding to said block next request signal.

29. The bus agent of claim 28 wherein:
said bus agent is capable of initiating a second request phase for a second transaction in a current clock cycle two bus clock cycles after a first request phase for a first transaction by asserting a plurality of request signals and a second transaction address strobe signal for the second transaction two bus cycles after assertion of a first transaction address strobe signal for the first transaction occurs if a most recent target ready signal active and data bus busy signal inactive observation occurs three or more bus clock cycles prior to the current clock cycle.

30. The bus agent of claim 29 wherein:
said bus agent is capable of sensing or asserting one or more of a plurality of snoop status signals for transaction N on a plurality of snoop status interfaces during a snoop phase occurring upon the later of:
three or more bus clock cycles of the bus clock signal after the assertion of an address strobe signal for transaction N; or
a most recent snoop phase for another transaction has been observed completed for zero or more clocks.

31. The bus agent of claim 30 wherein:
said bus agent is to track a plurality of a phases of a plurality of bus transactions on a bus which is a multi-phase pipelined bus, said bus agent is to track a transaction N−1 and a transaction N, wherein said bus controller is capable of asserting a response for transaction N two or more bus clock cycles after asserting a response for transaction N−1.

32. The bus agent of claim 27 wherein:
said bus agent is to track a plurality of transactions comprising a transaction N−1 and a transaction N, the bus controller being capable of asserting a target ready signal for transaction N if the bus agent is asserting the data busy signal for the transaction N−1 and deasserts the data busy signal.

33. A bus agent comprising:
address generation logic to drive two address elements in a duration of approximately one clock cycle of a bus clock signal, said address generation logic to generate a first address strobe to have a first address strobe transition at substantially a first address element center point of a first address element driving window in which the first address elements are driven, said address generation logic to generate said first address strobe to have a second transition at substantially a second address element center point of a second address element driving window in which the second address elements are driven;
data generation logic to drive four data elements in a second duration of approximately one clock cycle of the bus clock signal, said data generation logic to generate a first data strobe to have a first transition of the first data strobe at substantially a first data element center point of a first data element driving window in which a first data element is driven, and wherein said data generation logic is to generate a second data strobe to have a first transition of the second data strobe at substantially a second data element center point of a second data element driving window in which a second data element is driven, and wherein said data generation logic is to generate said first data strobe to have a second transition of the first data strobe at substantially a third data element center point of a third data element driving window in which a third data element is driven, and wherein said data generation logic is to generate said second data strobe to have a second transition of the second data strobe at substantially a fourth data element center point of a fourth data element driving window in which a fourth data element is driven.

34. The bus agent of claim 33 wherein a first transition of the first data strobe and a second transition of the first data strobe are of a first polarity and said first data strobe has a transition of opposite polarity after the first transition of the first data strobe and before the second transition of the first data strobe.

35. The bus agent of claim 33 wherein said first data strobe and said second data strobe have a frequency of twice a bus clock signal frequency.

36. The bus agent of claim 33 wherein said first and second transitions of the first and second data strobes are all either rising or falling edges.

37. The bus agent of claim 34 wherein said first address strobe transition is of a first type of either rising or falling and said second address strobe transition is of a second type, being the other of rising or falling, opposite the first address strobe transition.

38. The bus agent of claim 37 further comprising:
a control interface to transmit a common clock control signal in an address phase that also includes generation of said two address elements, and to generate a second common clock control signal in a data phase that also includes operation of said four data elements.

39. A bus agent comprising:
a control interface to drive control signals at a bus clock frequency;
an address bus interface to drive address elements at twice the bus clock frequency,
said address elements to be synchronized to an address strobe signal, a first transition of the address strobe signal being driven at approximately a center point of a first address element, a second transition of the address strobe being driven at approximately a center point of a second address element;
a data bus interface to drive data elements at four times the bus clock frequency, said data elements to be synchronized to a plurality of data strobe signals, said plurality of data strobe signals providing a transition at approximately a center point of each data element.

40. A bus agent comprising:
a control interface to drive a control signal at a clock frequency;
an address bus interface to transmit address elements at twice the clock frequency, said address bus interface to drive a substantially centered address strobe transition for each address element;
a data bus interface to transmit data elements at four times the clock frequency, said data bus interface to drive a substantially centered data strobe transition for each data element, wherein
said bus agent is capable of initiating an arbitration phase after two clocks from a prior arbitration phase and capable of receiving a block next request signal two bus clock cycles after assertion of an address strobe signal occurs and capable of responding to said block next request signal;
said bus agent is capable of initiating a second request phase for a second transaction in a current clock cycle two bus clock cycles after a first request phase for a first transaction by asserting a plurality of request signals and a second transaction address strobe signal for the second transaction two bus cycles after assertion of a first transaction address strobe signal for the first transaction occurs if a most recent target ready signal active and data bus busy signal inactive observation occurs three or more bus clock cycles prior to the current clock cycle;

said bus agent is capable of sensing or asserting one or more of a plurality of snoop status signals for transaction N on a plurality of snoop status interfaces during a snoop phase occurring upon a later one of:

three or more bus clock cycles of a bus clock signal after the assertion of an address strobe signal for transaction N; or a most recent snoop phase for another transaction has been observed completed for zero or more clocks.

41. The bus agent of claim 40 wherein said bus agent is to track a plurality of a phases of a plurality of bus transactions on a bus which is a multi-phase pipelined bus, said bus agent to track a transaction N−1 and a transaction N, wherein said bus agent is capable of asserting a response for transaction N in a current cycle two or more bus clock cycles after asserting a response for transaction N−1 if a most recent target ready signal active and data bus busy signal inactive observation occurred three or more clock cycles prior to the current cycle.

42. The bus agent of claim 41 wherein said bus agent is capable of asserting the target ready signal for transaction N if the bus agent is asserting the data busy signal for the transaction N−1 and deasserts the data busy signal.

43. A bus agent comprising:

a bus controller capable of initiating an arbitration phase after two clocks from a prior arbitration phase and capable of receiving a block next request signal two bus clock cycles after assertion of an address strobe signal and capable of responding to said block next request signal;

said bus controller is capable of initiating a second request phase for a second transaction in a current clock cycle two bus clock cycles after a first request phase for a first transaction by asserting a plurality of request signals and a second transaction address strobe signal for the second transaction two bus cycles after assertion of a first transaction address strobe signal for the first transaction occurs if a most recent target ready signal active and data bus busy signal inactive observation occurs three or more bus clock cycles prior to the current clock cycle;

said bus controller being capable of sensing or asserting one or more of a plurality of snoop status signals for transaction N on a plurality of snoop status interfaces during a snoop phase occurring upon a later one of:

three or more bus clock cycles of a bus clock signal after the assertion of an address strobe signal for transaction N; or a most recent snoop phase for another transaction has been observed completed for zero or more clocks.

44. The bus agent of claim 43 wherein said bus controller is to track a plurality of a phases of a plurality of bus transactions, said bus controller to track a transaction N−1 and a transaction N, wherein said bus controller is capable of asserting a response for transaction N in a current cycle two or more bus clock cycles after asserting a response for transaction N−1 if a most recent target ready signal active and data bus busy signal inactive observation occurred three or more bus clock cycles prior to the current cycle;

said bus controller being capable of asserting a target ready signal for transaction P if the bus agent is asserting a data busy signal for the transaction P−1 and deasserts the data busy signal.

45. The bus agent of claim 43 further comprising:

a control interface to operate at a clock frequency;

an address bus interface to transmit address elements at twice the clock frequency during a request phase, said address bus interface to drive a substantially centered address strobe transition for each address element, said address bus interface to drive;

a data bus interface to transmit data elements at four times the clock frequency during a data phase, said data bus interface to drive a substantially centered data strobe transition for each data element.

46. The bus agent of claim 44 wherein said bus controller is to support a plurality of transactions having a plurality of phases, said plurality of phases comprising an arbitration phase, a request phase, a snoop phase, a response phase, and a data phase, wherein some of said plurality of phases are optional for some transactions.

47. A bus agent comprising:

a bus controller to track a plurality of a phases of a plurality of bus transactions, said bus controller to track a transaction N−1 and a transaction N, wherein said bus controller is capable of asserting a response for transaction N two or more bus clock cycles after asserting a response for transaction N−1;

said bus controller being capable of asserting a target ready signal for transaction P if the bus agent is asserting a data busy signal for the transaction P−1 and deasserts the data busy signal.

48. The bus agent of claim 47 further comprising:

an address bus interface to transmit address elements at twice the clock frequency during the request phase, said address bus interface to drive a substantially centered address strobe transition for each address element;

a data bus interface to transmit data elements at four times the clock frequency during the data phase, said data bus interface to drive a substantially centered data strobe transition for each data element.

49. A system comprising:

a processor comprising:

a processor bus controller capable of initiating an arbitration phase after two clocks from a prior arbitration phase and capable of receiving a block next request signal two bus clock cycles after assertion of an address strobe signal occurs and capable of responding to said block next request signal;

said processor bus controller being capable of initiating a second request phase in a current clock cycle for a second transaction two clocks after a first request phase for a first transaction by asserting a plurality of request signals and a second transaction address strobe signal for the second transaction two bus cycles after assertion of a first transaction address strobe signal for the first transaction occurs if a most recent target ready signal active and data bus busy signal inactive observation occurred three or more bus clock cycles prior to the current clock cycle;

a chipset comprising:

a chipset bus controller to track a plurality of a phases of a plurality of bus transactions, said chipset bus controller to track a transaction N−1 and a transaction N, wherein said chipset bus controller is capable of asserting a response for transaction N in a current clock cycle two or more bus clock cycles after asserting a response for transaction N−1 if a most recent target ready signal active and data bus busy signal inactive observation occurred three or more clocks prior to the current cycle;

said chipset bus controller being capable of sensing or asserting one or more of a plurality of snoop status signals for transaction N on a plurality of snoop status interfaces during a snoop phase occurring upon a later one of:

three or more bus clock cycles of a bus clock signal after the assertion of an address strobe signal for transaction N; or a most recent snoop phase for another transaction has been observed completed for zero or more clock;

said chipset bus controller being capable of asserting a target ready signal for transaction N if the bus agent is asserting a data busy signal for the transaction N−1 and deasserts the data busy signal.

50. The system of claim 49 wherein each of said processor and said chipset further comprises:

a control interface to operate at a clock frequency;

an address bus interface to transmit address elements at twice the clock frequency, said address bus interface to drive a substantially centered address strobe transition for each address element;

a data bus interface to transmit data elements at four times the clock frequency, said data bus interface to drive a substantially centered data strobe transition for each data element.

51. A method comprising:

generating a first address element and a second address element in a first duration substantially equivalent in duration to a bus clock cycle of a bus clock signal;

generating an address strobe having a first address strobe transition substantially centered on said first address element and having second address strobe transition substantially centered on said second address element;

generating a first data element, a second data element, a third data element, and a fourth data element in a second duration substantially equivalent in duration to the bus clock cycle of the bus clock signal;

generating a plurality of data strobes to provide a data strobe transition substantially centered on each data element.

52. The method of claim 51 further comprising:

generating a common clock address strobe control signal according to a common clock protocol during a bus clock cycle in which transfer of said first and second address elements commences.

53. The method of claim 52 wherein said first address strobe transition has a first polarity and said second address strobe transition has a second polarity.

54. The method of claim 53 further comprising:

asserting a data bus busy signal for an N−1th transaction in a first bus clock cycle;

asserting a target ready signal for an Nth transaction in a second bus clock cycle which is adjacent to said first bus clock cycle only if a data bus busy signal is deasserted in the second bus cycle and if a bus agent deasserting the data bus busy signal also asserts the target ready signal.

55. An article comprising a machine readable medium that carries data representing an integrated circuit comprising:

a control interface to drive a control signal at a clock frequency;

an address bus interface to drive address elements at twice the clock frequency, said address bus interface to drive a substantially centered address strobe transition for each address element;

a data bus interface to drive data elements at four times the clock frequency, said data bus interface to drive a substantially centered data strobe transition for each data element.

56. The article of claim 55 carrying further data representing the integrated circuit, wherein said address bus interface is to drive a first address strobe at the clock frequency, said first address strobe having a first address strobe transition of a first polarity to be substantially centered on a first address element and a second address strobe transition of a second polarity to be substantially centered on a second address element, the second address element being consecutive to the first address element, and wherein said data bus interface is to drive four consecutive data elements and a first data strobe and a second data strobe, and wherein a first edge of a first type of the first data strobe is to be substantially centered on a first data element, a first edge of the first polarity of the second data strobe is to be substantially centered on the second data element, a second edge of the first polarity of the first data strobe is to be substantially centered on the third data element, and a second edge of the first polarity of the second data strobe is to be substantially centered on the fourth data element.

57. The article of claim 56 carrying further data representing the integrated circuit, which comprises a bus agent, said bus agent is to track a plurality of transactions comprising a transaction N−1 and a transaction N, the bus agent being capable of asserting the target ready signal for transaction N if the bus agent is asserting the data busy signal for the transaction N−1 and deasserts the data busy signal.

58. The article of claim 56 carrying further data representing the integrated circuit, which comprises a bus controller to track a plurality of a phases of a plurality of bus transactions, said bus controller to track a transaction N−1 and a transaction N, wherein said bus controller is capable of asserting a response for transaction N in a current cycle two or more bus clock cycles after asserting a response for transaction N−1 if a most recent target ready signal active and data bus busy signal inactive observation occurred three or more bus cycles prior to the current cycle, said bus controller being capable of asserting a target ready signal for transaction P if the bus agent is asserting a data busy signal for the transaction P−1 and deasserts the data busy signal.

59. An article comprising a machine readable carrier medium carrying data which, when loaded into a computer system memory in conjunction with simulation routines, provides functionality of a model comprising:

a bus controller capable of initiating an arbitration phase after two clocks from a prior arbitration phase and capable of receiving a block next request signal two bus clock cycles after assertion of an address strobe signal and capable of responding to said block next request signal;

said bus controller is capable of initiating a second request phase for a second transaction in a current clock cycle two bus clock cycles after a first request phase for a first transaction by asserting a plurality of request signals and a second transaction address strobe signal for the second transaction two bus cycles after assertion of a first transaction address strobe signal for the first transaction occurs if a most recent target ready signal active and data bus busy signal inactive observation occurs three or more bus clock cycles prior to the current clock cycle;

said bus controller being capable of sensing or asserting one or more of a plurality of snoop status signals for transaction N on a plurality of snoop status interfaces during a snoop phase occurring upon a later one of:

three or more bus clock cycles of a bus clock signal after the assertion of an address strobe signal for transaction N; or a most recent snoop phase for another transaction has been observed completed for zero or more clocks.

60. The article of claim 59 wherein the model further comprises:

a control interface to operate at a clock frequency;

an address bus interface to transmit address elements at twice the clock frequency during a request phase, said address bus interface to drive a substantially centered address strobe transition for each address element, said address bus interface to drive;

a data bus interface to transmit data elements at four times the clock frequency during a data phase, said data bus interface to drive a substantially centered data strobe transition for each data element.

61. An article comprising a machine readable carrier medium carrying data which, when loaded into a computer system memory in conjunction with simulation routines, provides functionality of a model comprising:

a bus controller to track a plurality of a phases of a plurality of bus transactions, said bus controller to track a transaction N−1 and a transaction N, wherein said bus controller is capable of asserting a response for transaction N in a current cycle two or more bus clock cycles after asserting a response for transaction N−1 if a most recent target ready signal active and data bus busy signal inactive observation occurred three or more bus cycles prior to the current cycle;

said bus controller being capable of asserting a target ready signal for transaction P if the bus agent is asserting a data busy signal for the transaction P−1 and deasserts the data busy signal.

62. The article of claim 61 wherein the model further comprises:

a control interface to operate at a clock frequency;

an address bus interface to transmit address elements at twice the clock frequency during a request phase, said address bus interface to drive a substantially centered address strobe transition for each address element, said address bus interface to drive;

a data bus interface to transmit data elements at four times the clock frequency during a data phase, said data bus interface to drive a substantially centered data strobe transition for each data element.

* * * * *